(12) United States Patent
Salsbury et al.

(10) Patent No.: US 10,824,127 B1
(45) Date of Patent: Nov. 3, 2020

(54) NEWTON-BASED EXTREMUM-SEEKING CONTROL SYSTEM

(71) Applicant: Johnson Controls Technology Company, Auburn Hills, MI (US)

(72) Inventors: Timothy I. Salsbury, Whitefish Bay, WI (US); Kirk H. Drees, Cedarburg, WI (US); John M. House, Saint-Leonard (CA); Carlos Felipe Alcala Perez, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/399,751

(22) Filed: Apr. 30, 2019

(51) Int. Cl.
*G05B 19/042* (2006.01)
*G05B 19/048* (2006.01)

(52) U.S. Cl.
CPC ......... *G05B 19/042* (2013.01); *G05B 19/048* (2013.01); *G05B 2219/24015* (2013.01); *G05B 2219/25011* (2013.01)

(58) Field of Classification Search
CPC ............... G05B 19/042; G05B 19/048; G05B 2219/24015; G05B 2219/25011
See application file for complete search history.

(56) References Cited

U.S. PATENT DOCUMENTS

| 7,827,813 | B2 | 11/2010 | Seem |
| 8,027,742 | B2 | 9/2011 | Seem et al. |
| 8,200,344 | B2 | 6/2012 | Li et al. |
| 8,200,345 | B2 | 6/2012 | Li et al. |
| 8,473,080 | B2 | 6/2013 | Seem et al. |
| 9,835,349 | B2 | 12/2017 | Salsbury et al. |
| 10,209,684 | B2 | 2/2019 | Salsbury et al. |
| 2003/0171901 | A1* | 9/2003 | Salsbury ............ G06F 17/12 703/2 |
| 2011/0193720 | A1* | 8/2011 | Chambers ........... G05B 15/02 340/870.03 |
| 2015/0134123 | A1* | 5/2015 | Obinelo ............... F24F 11/30 700/277 |

(Continued)

OTHER PUBLICATIONS

U.S. Appl. No. 16/029,246, filed Jul. 6, 2018, Turney et al.
(Continued)

*Primary Examiner* — Vincent H Tran
(74) *Attorney, Agent, or Firm* — Foley & Lardner LLP

(57) ABSTRACT

Systems and methods for monitoring and controlling a plant using extremum-seeking control. The method includes perturbing a setpoint for a controller by applying a dither signal to the setpoint. The controller uses a perturbed setpoint to generate one or more control inputs for the building equipment. Receiving, from the building equipment, an output signal and obtaining values of a performance variable based on the output signal, the values of the performance variable resulting from operating the building equipment based on the perturbed setpoint. The method includes determining a gradient of the performance variable with respect to the perturbed setpoint and a Hessian of the performance variable affected by the building equipment with respect to the setpoint. The method includes determining an adjustment to the setpoint predicted to drive the performance variable to an extremum based on the gradient and the Hessian of the performance variable.

20 Claims, 11 Drawing Sheets

(56) References Cited

U.S. PATENT DOCUMENTS

| | | | |
|---|---|---|---|
| 2015/0226446 A1* | 8/2015 | Dempster | G05B 15/02 |
| | | | 700/276 |
| 2016/0132027 A1 | 5/2016 | Li et al. | |
| 2016/0370771 A1* | 12/2016 | Torres Fuchslocher | |
| | | | G05B 13/0255 |
| 2017/0241657 A1* | 8/2017 | Salsbury | F24F 11/62 |
| 2017/0241658 A1 | 8/2017 | Salsbury et al. | |
| 2018/0267515 A1 | 9/2018 | House et al. | |
| 2018/0299839 A1 | 10/2018 | Salsbury et al. | |
| 2019/0041077 A1 | 2/2019 | Salsbury et al. | |

OTHER PUBLICATIONS

U.S. Appl. No. 16/029,255, filed Jul. 6, 2018, Turney et al.
U.S. Appl. No. 16/107,628, filed Aug. 21, 2018, Salsbury, Timothy.
Barnett, E. H. (1960). "Introduction to Evolutionary Operation." Industrial Chemical Engineering, vol. 5, No. 6 (Jun. 1960), pp. 500-503 (4 pages).
Ghaffari, A., Krstic, M., Nesic, D. (2012). "Multivariable Newton-Based Extremum Seeking." Automatica, vol. 48 (2012), pp. 1759-1767 (9 pages).

* cited by examiner

NEWTON-BASED EXTREMUM-SEEKING CONTROL SYSTEM

BACKGROUND

The present disclosure relates generally to extremum-seeking control strategies. The present disclosure relates more particularly to regulating, via extremum-seeking control, a performance variable (e.g., power production, power consumption, etc.) in an energy system. The present disclosure relates more particularly still to determining an adjustment to a setpoint signal of a building that will bring a performance variable of building equipment that operates to bring variables associated with the setpoint to an extremum quickly.

Extremum-seeking control (ESC) is a class of self-optimizing control strategies that can dynamically search for the unknown and/or time-varying inputs of a system for optimizing a certain performance index. It can be considered a dynamic realization of gradient searching through the use of dither signals. The gradient of the system output with respect to the system input is typically obtained by slightly perturbing the system operation and applying a demodulation measure. Optimization of system performance can be obtained by driving the gradient towards zero by using an integrator in the closed-loop system. ESC is a non-model based control strategy, meaning that a model for the controlled system is not necessary for ESC to optimize the system.

ESC has been used in many different engineering applications (e.g., combustion, circuitry, mining, aerospace and land-based vehicles, building HVAC, wind and solar energy, etc.) and has been shown to be able to improve the operational efficiency and performance for these engineering applications. A variety of different types of ESC have been developed including dither ESC, switching ESC, sliding-mode ESC, adaptive ESC, among others. Each type of ESC has its respective advantages and disadvantages. Each of these approaches to ESC is implemented to drive a gradient of a control system to zero.

Typical ESC controllers operate by finding a gradient of a performance variable with respect to a manipulated variable associated with different building equipment configurations and constantly updating the manipulated variable until the gradient is driven to zero. The controllers generally update the configurations of pieces of building equipment before determining the gradient of associated performance variables.

SUMMARY

One implementation of the present disclosure is a system for operating and assessing performance of building equipment, the system including a dither signal generator. The dither signal generator can be configured to perturb a setpoint for a controller by applying a dither signal to the setpoint, resulting in a perturbed setpoint and provide the perturbed setpoint to the controller, wherein the controller uses the perturbed setpoint to generate one or more control inputs for the building equipment, and the building equipment operate in accordance with the control inputs to affect a performance variable indicating a performance of the building equipment. The system can include a performance assessment system configured to receive, from the building equipment, an output signal and obtain values of the performance variable based on the output signal, the values of the performance variable resulting from operating the building equipment based on the perturbed setpoint and determine, from the values of the performance variable, a gradient of the performance variable with respect to the perturbed setpoint and a Hessian of the performance variable affected by the building equipment with respect to the setpoint. The performance assessment system can be conjured to determine an adjustment to the setpoint predicted to drive the performance variable to an extremum based on the gradient of the performance variable and the Hessian of the performance variable.

In some embodiments, the system is configured to determine the adjustment based at least on multiplying the gradient and an inverse of the Hessian of the performance variable.

In some embodiments, the system determines the gradient and the Hessian of the performance variable by passively observing an effect of the perturbed setpoint on the output signal without additional perturbations to the control input after the dither signal is applied.

In some embodiments, the performance assessment system is configured to apply the adjustment to the setpoint, the adjustment causing the controller to adjust an operation of the equipment to drive the performance variable to the extremum.

In some embodiments, the system is configured to determine the gradient of the performance variable and the Hessian of the performance variable by applying a plurality of demodulation signals to the output signal. One demodulation signal of the one or more demodulation signals is associated with a perturbation matrix that generates an estimate of the Hessian. A second demodulation signal of the one or more demodulation signals is a sinusoidal signal that generates the gradient.

In some embodiments, the system is configured to determine the gradient of the performance variable and the Hessian of the performance variable by converting the values of the output signal to a vector to create a data sample vector; generating a multivariable form of the data sample vector using a least squares technique; and obtaining a gradient vector and the Hessian based on the multivariable form of the data sample vector.

In some embodiments, the system is configured to determine the adjustment based on recursively implementing the converting, generating, and obtaining operations until the performance variable reaches an extremum.

In some embodiments, the performance variable indicates a performance characteristic of the building equipment affected by the setpoint to the controller.

In some embodiments, the performance characteristic is a total power consumption of the building equipment affected by the setpoint to the controller.

In another implementation of the present disclosure, a method for monitoring and controlling a plant using extremum-seeking control is described. The method includes perturbing a setpoint for a controller by applying a dither signal to the setpoint, resulting in a perturbed setpoint and providing the perturbed setpoint to the controller, wherein the controller uses the perturbed setpoint to generate one or more control inputs for the building equipment, and the building equipment operate in accordance with the control inputs to affect a performance variable indicating a performance of the building equipment. The method includes receiving, from the building equipment, an output signal and generate values of the performance variable based on the output signal, the values of the performance variable resulting from operating the building equipment based on the perturbed setpoint. The method includes determining, from the values of the performance variable, a gradient of the performance variable with respect to the perturbed setpoint and a Hessian of the performance variable affected by the building equipment with respect to the setpoint and determining an adjustment to the setpoint predicted to drive the performance variable to an extremum based on the gradient of the performance variable and the Hessian of the performance variable.

In some embodiments, determining the adjustment is based at least on multiplying the gradient and an inverse of the Hessian of the performance variable.

In some embodiments, determining the gradient and the Hessian of the performance variable comprises passively observing an effect of the perturbed setpoint on the output signal without additional perturbations to the control input after the dither signal is applied.

In some embodiments, the method includes applying the adjustment to the setpoint, the adjustment causing a controller to adjust an operation of the equipment to drive the performance variable to the extremum.

In some embodiments, determining the gradient of the performance variable and the Hessian of the performance variable comprises applying a plurality of demodulation signals to the output signal. One demodulation signal of the one or more demodulation signals is associated with a perturbation matrix that generates an estimate of the Hessian. A second demodulation signal of the one or more demodulation signals is a sinusoidal signal that generates the gradient.

In some embodiments, determining the gradient of the performance variable and the Hessian of the performance variable includes converting the values of the output signal to a vector to create a data sample vector; generating a multivariable form of the data sample vector using a least squares technique; and obtaining a gradient vector and the Hessian based on the multivariable form of the data sample vector.

In some embodiments, the system is configured to determine the adjustment based on recursively implementing the converting, generating, and obtaining operations until the performance variable reaches an extremum.

In yet another implementation of the present disclosure, a non-transitory computer-readable storage medium having instructions stored thereon that, upon execution by a processor, cause the processor to perform operations to determine an adjustment to drive a performance variable toward an extremum, the operations including perturbing a setpoint for a controller by applying a dither signal to the setpoint, resulting in a perturbed setpoint. The instructions include providing the perturbed setpoint to the controller, wherein the controller uses the perturbed setpoint to generate one or more control inputs for the building equipment, and the building equipment operate in accordance with the control inputs to affect a performance variable indicating a performance of the building equipment. The instructions include receiving, from the building equipment, an output signal and generate values of the performance variable based on the output signal, the values of the performance variable resulting from operating the building equipment based on the perturbed setpoint. The instructions include determining, from the values of the performance variable, a gradient of the performance variable with respect to the perturbed setpoint and a Hessian of the performance variable affected by the building equipment with respect to the setpoint; and determining an adjustment to the setpoint predicted to drive the performance variable to an extremum based on the gradient of the performance variable and the Hessian of the performance variable.

In some embodiments, determining the gradient of the performance variable and the Hessian of the performance variable comprises applying one or more demodulation signals to the output signal. One demodulation signal of the one or more demodulation signals is associated with a perturbation matrix that generates an estimate of a Hessian. A second demodulation signal of the one or more demodulation signals is a sinusoidal signal that generates the gradient.

In some embodiments, determining the gradient of the performance variable and the Hessian of the performance variable includes converting the values of the output signal to a vector to create a data sample vector; generating a multivariable form of the data sample vector using a least squares technique; and obtaining a gradient vector and a Hessian based on the multivariable form of the data sample vector.

In some embodiments, the operations comprise applying the adjustment to the setpoint, the adjustment causing a controller to adjust an operation of the equipment to drive the performance variable to the extremum.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
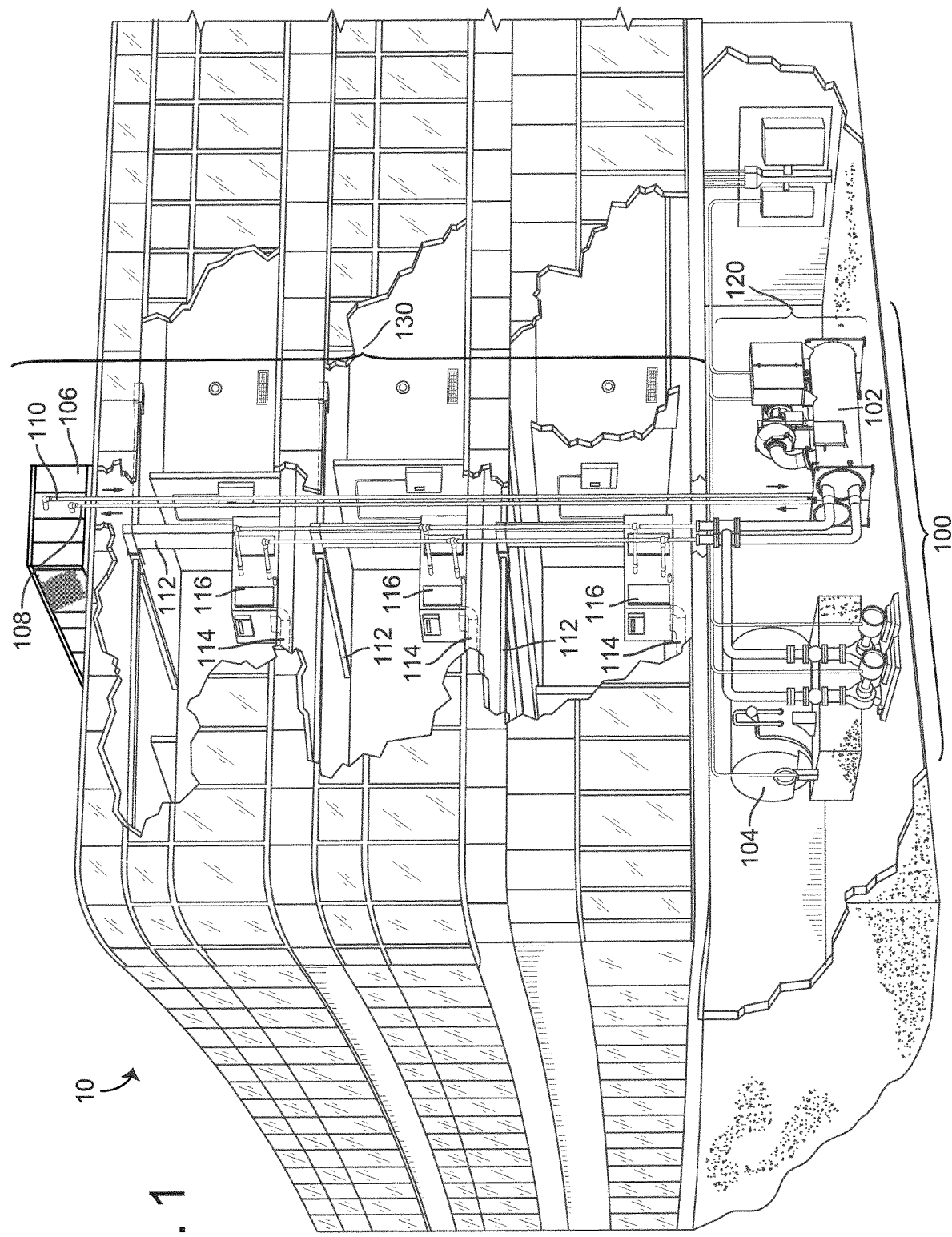
FIG. 1 is a drawing of a building equipped with a HVAC system, according to some embodiments.

Referring generally to the figures, Newton-based extremum-seeking control (NESC) systems and methods are shown, according to various exemplary embodiments. In general, extremum-seeking control (ESC) is a class of self-optimizing control strategies that can dynamically search for the unknown and/or time-varying inputs of a system for optimizing a certain performance index. It can be considered a dynamic realization of gradient searching through the use of dither signals. The gradient of the system output with respect to the system input is typically obtained by slightly perturbing the system operation and applying a demodulation measure. Optimization of system performance can be obtained by driving the gradient towards zero by using an integrator in the closed-loop system. ESC is a non-model based control strategy, meaning that a model for the controlled system is not necessary for ESC to optimize the system. Various implementations of ESC are described in detail in U.S. Pat. Nos. 8,473,080, 7,827,813, 8,027,742, 8,200,345, and 8,200,344, each of which is incorporated by reference herein.

The current disclosure is directed to a new type of ESC (i.e., Newton-based ESC) that can be implemented in an open-loop environment and optionally a closed-loop environment to determine changes in setpoint of a building system that will bring a performance variable (e.g. power usage, maximum power output, etc.) to an extremum. Advantageously, Newton-based ESC (NESC) is capable of determining a change in setpoint without knowing an entire cost function and is adaptive to be able to handle setpoints of any type in a building environment. NESC can be implemented using a performance assessment system as described below.

In operation, a dither signal module can modify a steady state setpoint signal, which can be generated by a setpoint signal generator and updated by a performance assessment system to a building system by adding a dither signal (e.g., a small-amplitude periodic signal) to the steady state setpoint signal. The dither signal can be aggregated with the setpoint signal to obtain a perturbed setpoint signal that is used as an input into the building system. The performance assessment system can extract a building system output that includes values of a performance variable indicating how efficiently the building equipment of the building system is operating and a value associated with a user set setpoint indicating whether the system is operating at the setpoint based on the dithered setpoint. The performance assessment system can store the output and apply demodulation signals to the output data to obtain both a gradient and a Hessian matrix associated with the output. The performance assessment system can then multiply an inverse of the Hessian matrix with the gradient to obtain a change in the setpoint signal so building equipment that operates based on the setpoint signal can operate more efficiently. In another embodiment, the performance assessment system can convert the output into a vector and implement a least squares method to determine the gradient and the Hessian and consequently obtain the Newton step.

Advantageously, the performance assessment system can operate in an open loop environment. Consequently, any calculations performed by the performance assessment system can be used as data points that an operator of the performance assessment system can analyze and either choose to ignore or use to update the setpoint signal. In some embodiments, the performance assessment system can operate in a closed loop environment and automatically update the setpoint signal based on its calculation of the Newton step. An advantage to using Newton based control to determine Newton steps in either the closed loop or open loop system is the performance assessment system can determine a change in setpoint, and therefore a change in building equipment configuration, that will result in building equipment operating more efficiently with less data and more accurately than other methods of ESC. The performance assessment system can bring the setpoint to an optimal point without changing configurations and reevaluating to determine a new optimal configuration.

In one implementation, the performance assessment system can implement demodulation signals to the building system outputs to determine Newton steps associated with the perturbed setpoint input. One demodulation signal can be a sinusoidal signal that is used in combination with an output signal from the building system to estimate a gradient of the cost function. Another demodulation signal can be associated with a matrix that is used in combination with the building system output signal to generate an estimate of a Hessian matrix of the cost function. An inverse of the Hessian can then be determined based on the estimated Hessian matrix. The inverse of the Hessian can be multiplied by the gradient function to obtain a Newton step that operates to change a setpoint so values of a performance variable associated with the cost function can be brought closer to an extremum. Further, the gradient vector can quickly approach zero.

In another implementation, the performance assessment system can determine a Newton step using a recursive least squares technique. Using the recursive least squares technique, the performance assessment system can calculate the same Newton step but use vectors instead of demodulation signals to determine the Newton step. For example, the performance assessment system implementing the recursive least square technique can vectorize the performance variable outputs associated with the cost function and determine a general quadratic equation for the vector that estimates the cost function based on the vector. The performance assessment system can then calculate a gradient vector and a Hessian matrix to calculate a Newton step associated with the cost function.

Advantageously, the performance assessment system can automatically determine changes in building equipment operation while minimizing the processing power the building equipment uses by calculating and making, if the performance assessment system or an administrator determines it to be proper, jumps in performance efficiency much greater than in other ESC systems. The Newton based ESC system can operate in both an open-loop environment and a closed-loop environment so an administrator can change the building equipment after the controller determines a Newton step or the performance assessment system can adaptively change the setpoint input into a building equipment configuration using calculated Newton steps.

Although NESC systems and methods of the present disclosure describe NESC primarily in the context of a building HVAC system, it is understood that NESC can be generally applicable to any type of control system that optimizes or regulates a variable of interest. For example, the NESC systems and methods of the present disclosure can be used to optimize an amount of energy produced by various types of energy producing systems or devices (e.g., power plants, steam or wind turbines, solar panels, combustion systems, etc.) and/or to optimize an amount of energy consumed by various types of energy consuming systems or devices (e.g., electronic circuitry, mechanical equipment, aerospace and land-based vehicles, building equipment, HVAC devices, etc.). In various implementations, NESC be used in any type of controller that functions to achieve a setpoint for a variable of interest (e.g., by minimizing a difference between a measured or calculated input and a setpoint) and/or optimize a variable of interest (e.g., maximize or minimize an output variable).

It is understood that NESC can be readily implemented in various types of controllers (e.g., motor controllers, power controllers, fluid controllers, HVAC controllers, lighting controllers, chemical controllers, process controllers, etc.) and various types of control systems (e.g., closed-loop control systems, open-loop control systems, feedback control systems, feed-forward control systems, etc.) as can be suitable for various applications. All such implementations should be considered within the scope of the present disclosure. It is also understood that the invention is not limited to the details or methodology set forth in the description or illustrated in the figures. The terminology used in the present disclosure is for the purpose of description only and should not be regarded as limiting.

Building and HVAC System

Figure 2:
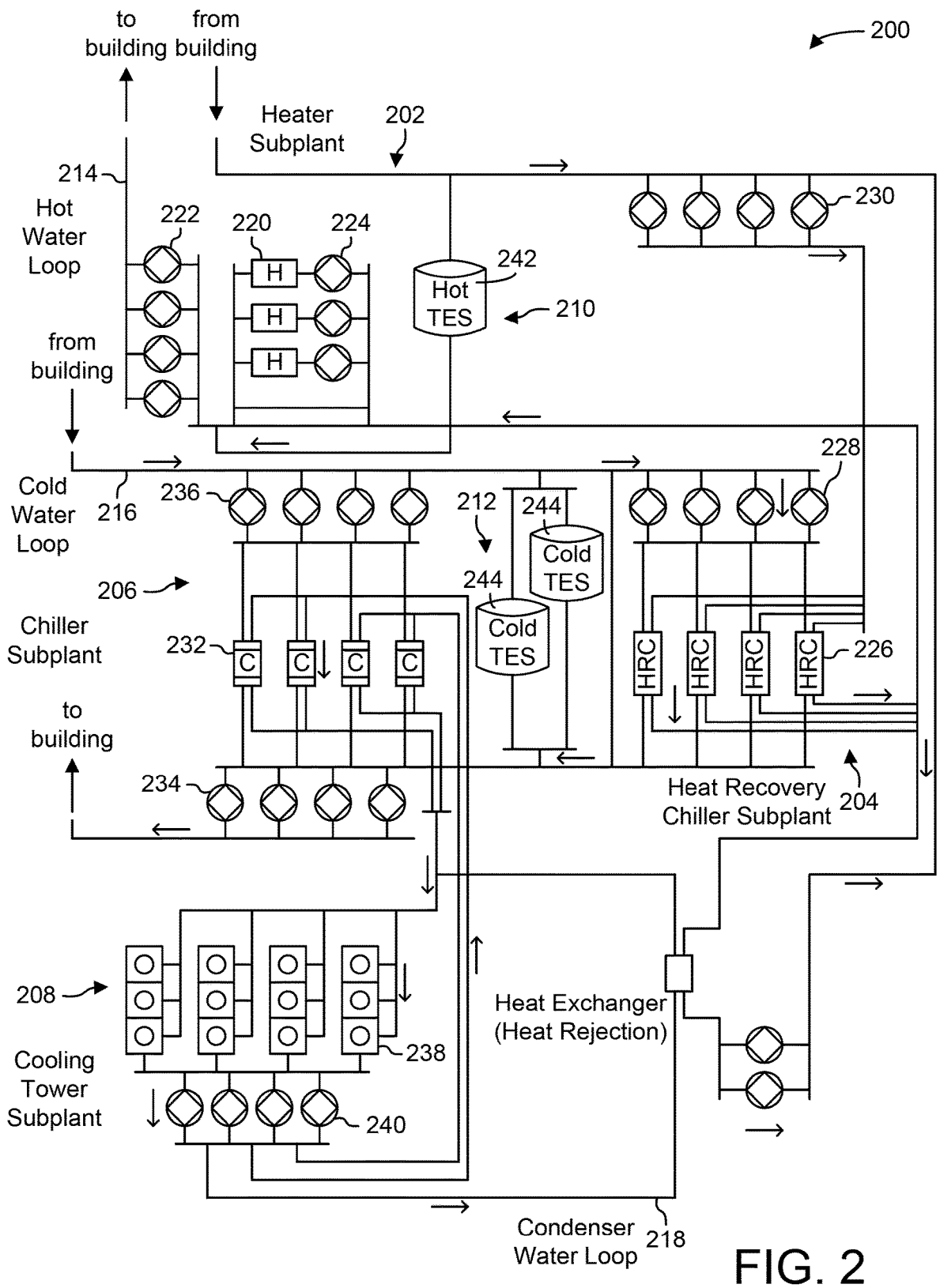
FIG. 2 is a block diagram of a waterside system that can be used in conjunction with the building of FIG. 1, according to some embodiments.
Figure 3:
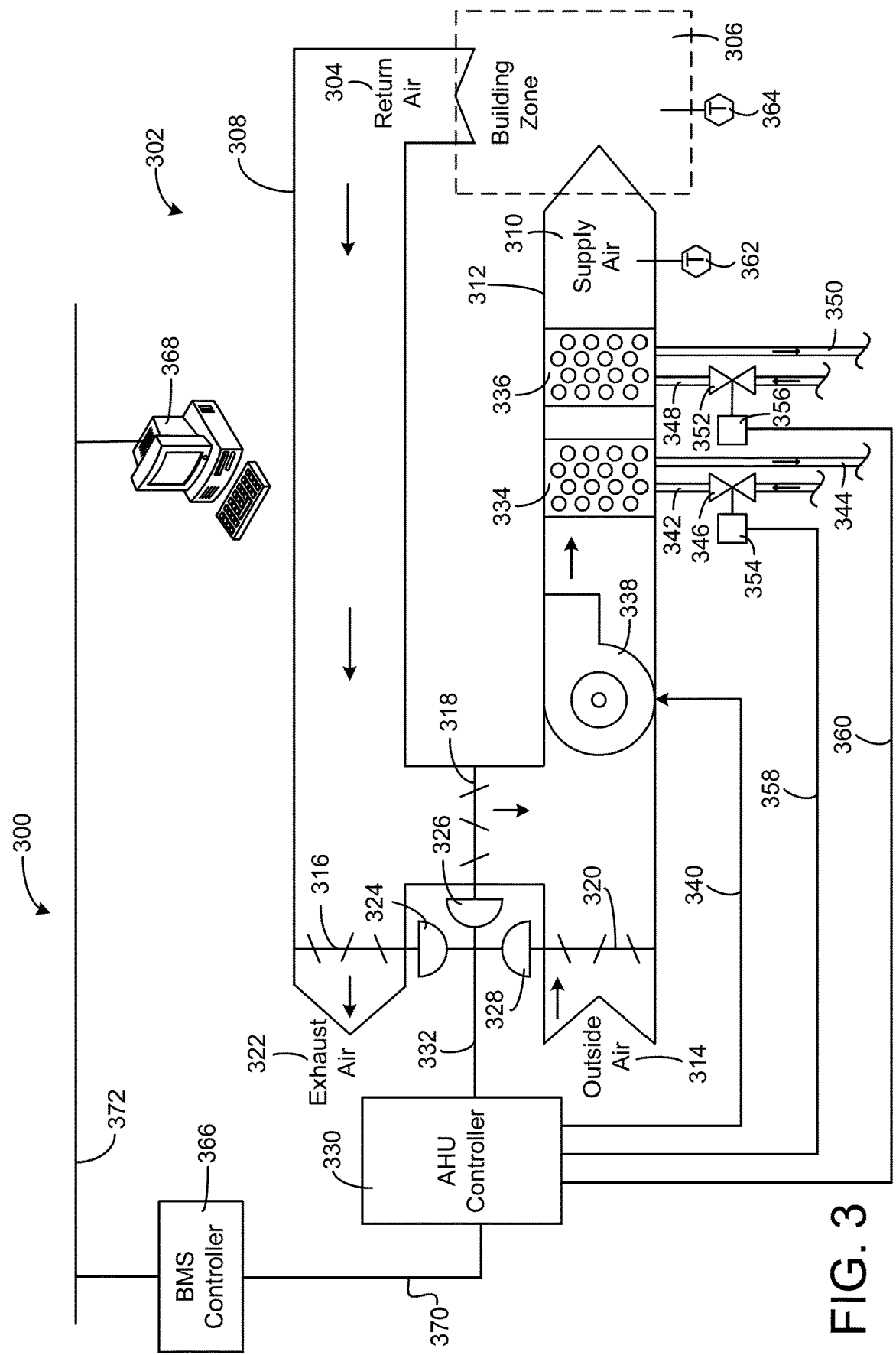
FIG. 3 is a block diagram of an airside system that can be used in conjunction with the building of FIG. 1, according to some embodiments.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum-seeking control (ESC) algorithms, proportional-integral (PI) control algorithms, proportional-integral-Hessian (PIH) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and can correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a computing device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Computing device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Computing device 368 can be a computer workstation, a client terminal, a remote or local interface, or any other type of user interface device. Computing device 368 can be a stationary terminal or a mobile device. For example, computing device 368 can be a desktop computer, a computer server with a user interface, a laptop computer, a tablet, a smartphone, a PDA, or any other type of mobile or non-mobile device. Computing device 368 can communicate with BMS controller 366 and/or AHU controller 330 via communications link 372.

Newton-Based Extremum-Seeking Control System

Figure 4A:
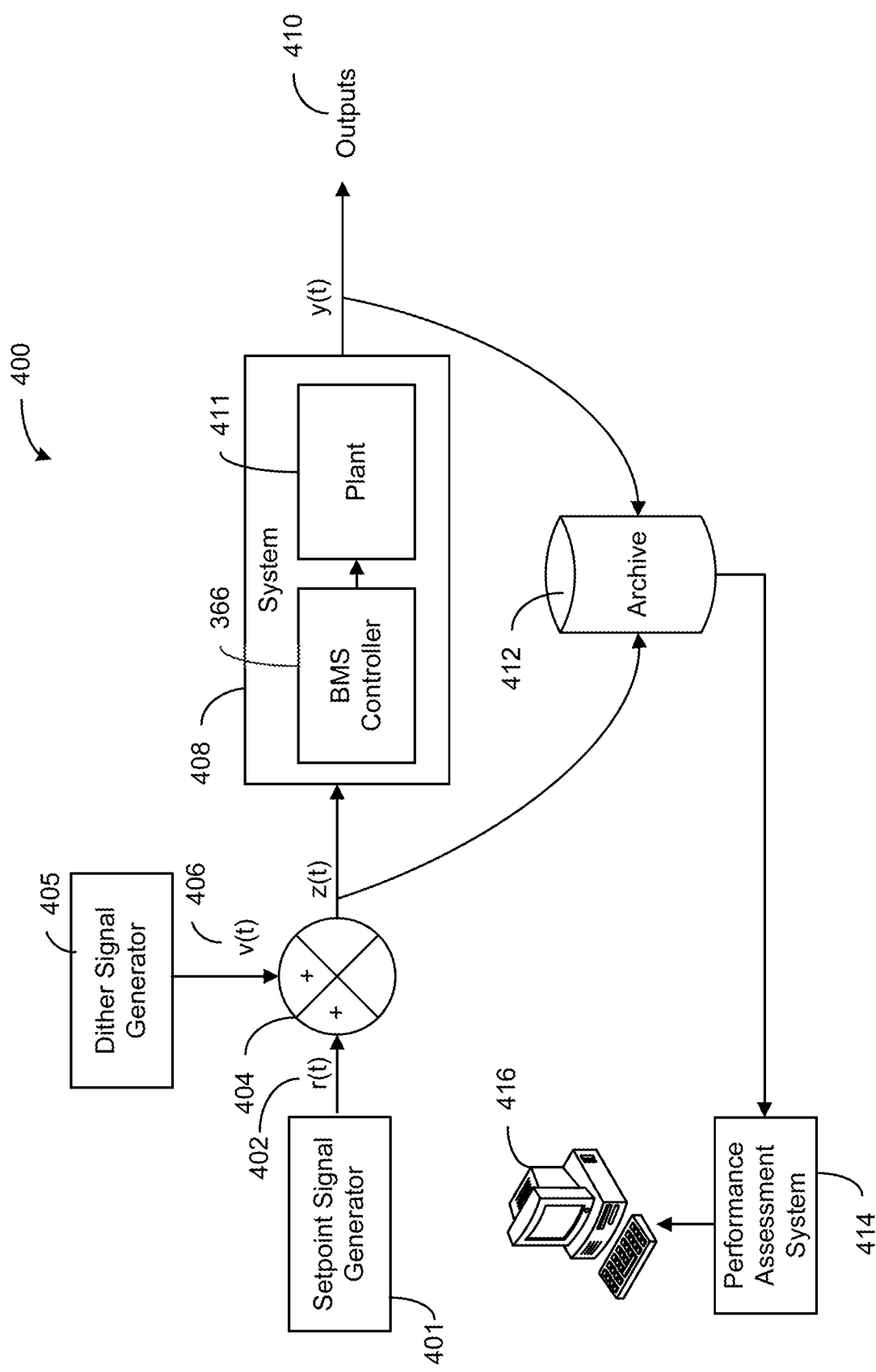
FIG. 4A is a block diagram of an open loop ESC environment implementing a passive Newton based ESC monitoring strategy with a performance assessment system, according to some embodiments.

Referring now to FIG. 4A, a block diagram illustrating an open-loop ESC environment 400 used to passively monitor data inputs and outputs as a dither signal is applied to a steady state setpoint is shown, according to some embodiments. Having an open-loop ESC environment model can be useful in a building automation system (BAS) so operators of the BAS can aggregate and analyze data without making any adjustments to the system. The operators can gather the data and holistically examine the results to see how changing the setpoint will impact the BAS as a whole. Open-loop ESC environment 400 is shown to include setpoint signal generator 401, aggregator 404, dither signal generator 405, system 408, archive 412, and performance assessment system 414. A dither signal 406 and a setpoint signal 402 are shown to be inputs into aggregator 404. Aggregator 404 is shown to have a corresponding output z(t) as an input into system 408 and archive 412. System 408 has an output y(t) 410 representing a performance variable associated with devices of plant 411. y(t) is shown to be an input into archive 412. Archive 412 is shown to have an output into performance assessment system 414 which has an output into computing device 416.

Setpoint signal generator 401 can be configured to generate a setpoint signal to send to BMS controller 366, in some embodiments. Setpoint signal generator 401 can generate setpoint signals associated with any number of building characteristics and can generate and send any number of setpoint signals. Setpoint signal generator 401 can generate setpoint signals operating in steady state with an average that converges to a steady state value of the signal. Setpoint signal generator 401 can determine a steady state value of a setpoint signal based on an input from an administrator operating performance assessment system 414. For example, an administrator may configure setpoint signal generator 401 to continuously provide a temperature setpoint of 55 degrees to system 408. Setpoint signal generator 401 can continuously provide the temperature setpoint signal to system 408 until it is configured to do otherwise. In some embodiments, setpoint signal generator 401 is a component of performance assessment system 414

Setpoint signal 402 can be a steady state setpoint signal with a target value of one or more variables set by an administrator and which is used to generate configurations for plant 411 in system 408. In some embodiments, setpoint signal 402 can be a vector. Each value of the vector can be associated with a different variable of system 408. The variables can be related to building characteristics, such as temperature, air pressure, water temperature, air flow, etc. Variables associated with setpoint signal 402 can be associated with any building characteristic. The setpoint can be any value and the variables can be associated with any number of building characteristics. Setpoint signal 402 can be sent to BMS controller 366 of system 408. BMS controller 366 can receive setpoint signal 402 and determine configurations of plant 411 to drive values associated with setpoint signal 402 toward target values of the setpoint signal. For example, a target temperature of a room within a building can be affected by building equipment controlled by the BMS controller 366 and setpoint signal 402. Setpoint signal 402 can be associated with a 55-degree room temperature. BMS controller 366 can receive setpoint signal 402 and change the configurations of plant 411 so plant 411 can operate to keep the room at 55 degrees. In some embodiments, setpoint signal 402 can be associated with multiple values associated with different variables of a building. Setpoint signal 402 can be associated with any number of variables of a building.

In some embodiments, a dither signal generator 405 can add a dither signal 406, represented by v(t), to setpoint signal 402 to provide a dithered setpoint, z(t), into system 408. Dither signal 406 can be a periodic or non-periodic signal with any amplitude and/or frequency. Dither signal 406 can also be a randomly generated signal. In some embodiments, dither signal 406 is a signal with a small amplitude so setpoint signal 402 is not affected to a degree where inhabitants of an environment created by system 408 notice the effects of dither signal 406. To ensure dither signal 406 is not noticeable, dither signal generator 405 can make sure an amplitude of dither signal 406 is never more than 10% of an amplitude of setpoint signal 402. Dither signal 406 can be useful in an open-loop system as data generated from applying dither signal 406 to setpoint signal 402 can be controlled and easily analyzed over a time period that dither signal 406 is applied. Because dither signal 406 has a small amplitude, data can be gathered while system 408 is operating without substantially affecting a setpoint of variables within system 408.

Aggregator 404 can be a component within setpoint signal generator 401 used to add setpoint signal 402 to dither signal 406. For example, setpoint signal 402 can be represented by a signal r(t) that has a steady state room temperature value of 50 degrees. Dither signal 406 can be represented by v(t)=random(t), or any other function or value. Setpoint signal 402 and dither signal 406 can be represented by any signal. Aggregator 404 can combine v(t) and r(t) to obtain a modified setpoint, z(t)=r(t)+v(t), that is provided as an input to system 408 and to archive 412.

System 408 can be a BAS with any number of building devices and controllers. System 408 can include BMS controller 366, shown and described with reference to FIG. 3, and plant 411. BMS controller 366 can control the configurations of any building devices of plant 411. Plant 411 can be a process and one or more mechanically-controlled outputs. For example, plant 408 can be an air handling unit configured to control temperature within a building space via one or more mechanically-controlled actuators and/or dampers. In various embodiments, plant 408 can include a chiller operation process, a damper adjustment process, a mechanical cooling process, a ventilation process, or any other process where a variable is manipulated to affect an output from plant 408. In some embodiments, system 408 includes BMS controller 366 that is configured to control plant 411 of system 408.

Plant 411 can be any devices shown and described with reference to FIGS. 1-3 that operate to affect characteristics (e.g., temperature, pressure, airflow, etc.) of a building. System 408, through BMS controller 366, can receive dithered setpoint signals, z(t), from aggregator 404, adjust configurations of each piece of building equipment based on the dithered setpoint signals, and provide an output 410. Output 410, represented by a signal, y(t), can represent different characteristics of a building such as, but not limited to, temperature, air pressure, air flow, water temperature, etc. Output 410 can also include performance variable values such as energy usage, energy output, etc. power usage, time operating, etc. Each of outputs 410 can be generated by sensors within system 408 that track different building characteristics. Output 410 can be archived in archive 412.

System 408 can receive a plurality of dithered setpoint inputs (e.g., $z(t)_1$, $z(t)_2$, . . . , $z(t)_N$) from setpoint signal generator 401. In some embodiments, BMS controller 366 of system 408 can receive a setpoint signal including a vector with N values. In some embodiments, plant 411 of system 408 can include multiple components, or pieces of building equipment. Each component is controlled by BMS controller 366, which can receive multiple setpoint signals as inputs from setpoint signal generator 401 to control plant 411. In some embodiments, setpoint signals provided by setpoint signal generator 401 can be perturbed by dither signal generator 405 to produce dithered setpoint signals z(t). For example, setpoint signal generator 401 can generate a setpoint signal r(t) to aggregator 404 indicating for the temperature in a room to be 70 degrees. Dither signal generator 405 can provide a dither signal to aggregator 404 to aggregate the signals. Aggregator 404 can aggregate the signals to obtain dithered setpoint signal z(t). BMS controller 366 can receive the dithered setpoint signal z(t).

In some embodiments, BMS controller 366 can receive multiple setpoint signals. BMS controller 366 can receive setpoint signals $z(t)_1$, $z(t)_2$, . . . $z(t)_N$ (not shown), where N is the total number of setpoint signals or values of one setpoint signal provided to system 408 for N pieces of building equipment. Controller 366 can receive any number of setpoint signals.

Archive 412 can be a database within a controller or server configured to store outputs 410 and outputs from aggregator 404. Archive 412 can be stored in a graph database, MySQL, Oracle, Microsoft SQL, PostgreSQL DB2, document store, search engine, key-value store, etc. Building operation database 517 is configured to hold any amount of data and can be made up of any number of components, in some embodiments. For example, archive 412 can store outputs 410 from system 408 and outputs from aggregator 404 within a table (not shown) that matches the outputs that are associated with each other. The table can identify timestamps identifying when each output was input into archive 412. In some embodiments, archive 412 generates a vector for data points received with different time stamps. After archiving the data within archive 412, archive 412 can send the data through performance assessment system 414 to determine how setpoint signal 402 should change.

Performance assessment system 414 can be one or more servers or processors configured to receive outputs 410 from system 408 through archive 412 and determine changes in the setpoint of a building or area and cause building equipment servicing of the building or area to operate more efficiently. Because performance assessment system 414 of open-loop ESC environment 400 is in an open loop environment, however, performance assessment system 414 may not directly adjust setpoint signal 402 after determining a change in setpoint for plant 411 of system 408 to operate, in some embodiments. Performance assessment system 414 can provide passive data including a performance assessment as a signal or report to computing device 416. Computing device 416 can be a computer connected to a network (not shown) and be configured to process and display data via a user interface of a display. Computing device 416 can display the report to an administrator at an interface of computing device 416. The administrator may be operating setpoint signal generator 401 and be able change the setpoint signal being generated by setpoint signal generator 401 according to the report generated by performance assessment system 414. Performance assessment system 414 can be a device in any type of ESC system (e.g., closed loop or open loop).

In an exemplary embodiment, performance assessment system 414 can be configured to determine a Newton step, or change in a setpoint signal, so different pieces of building equipment of plant 411 can operate as efficiently as possible. Performance assessment system 414 can determine if the building equipment is operating efficiently using performance variables representing power consumption, power output, etc., and/or any other indicators of how the equipment is operating. As described herein, performance assessment system 414 can use different demodulation signals or a least squares technique to determine a Hessian matrix associated with outputs 410 and a corresponding change in setpoint for building equipment that could operate more efficiently. As described below, while in some embodiments a Newton step can be determined at performance assessment system 414 and transmitted to computing device 416 to be displayed at an interface of computing device 416, in other embodiments, performance assessment system 414 can automatically determine if applying a calculated Newton step to a system would cause the system to operate more efficiently and be desirable. In these embodiments, performance assessment system 414 can send a signal to setpoint signal generator 401 to update the setpoint signal being provided to system 408.

Figure 4B:
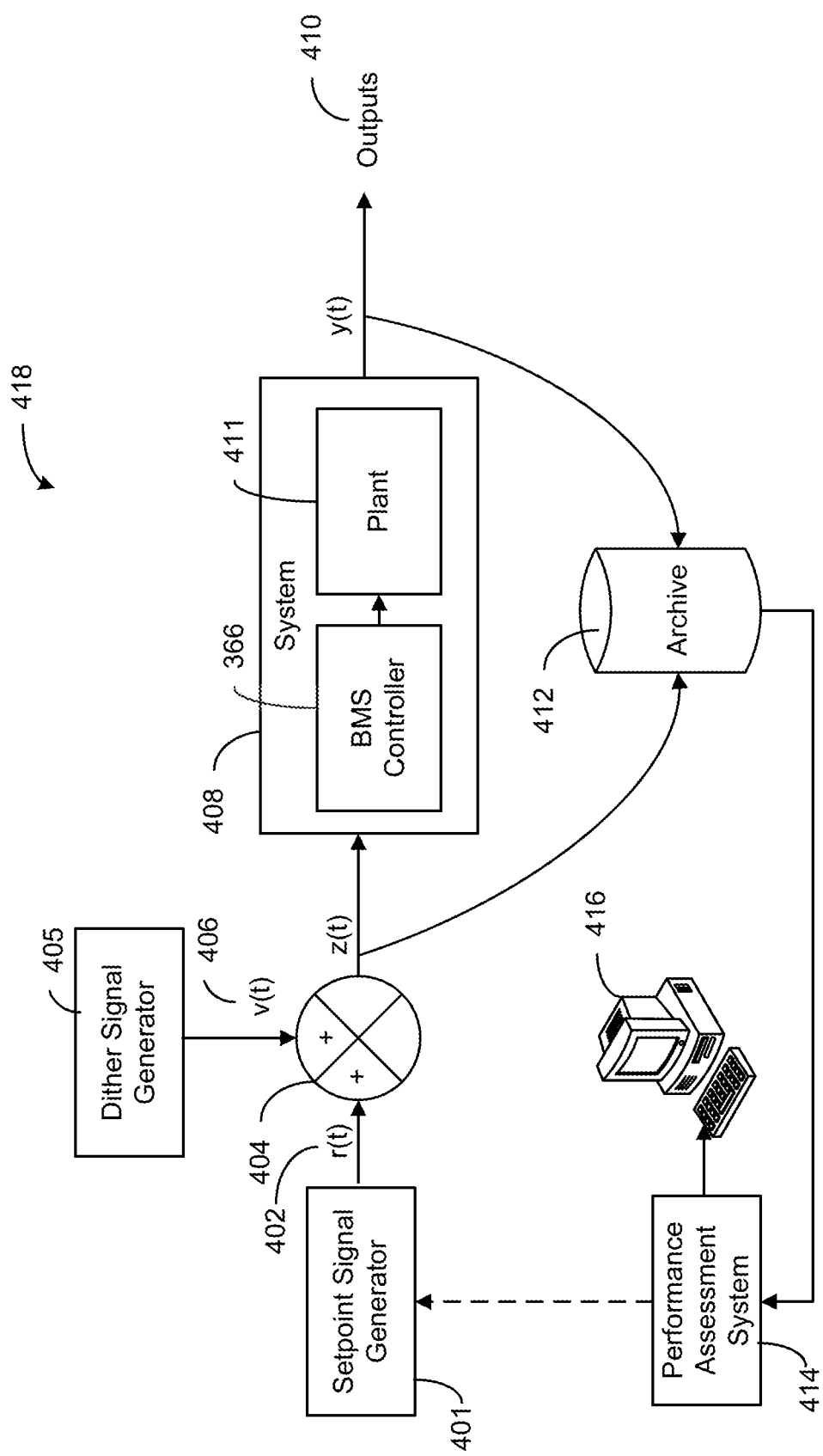
FIG. 4B is a block diagram of a closed loop ESC environment implementing a closed loop Newton based ESC monitoring and control strategy with the performance assessment system, according to some embodiments.

Referring now to FIG. 4B, a block diagram of a closed loop ESC environment 418 implementing a closed loop Newton based ESC monitoring and control strategy with performance assessment system 414 is shown, according to some embodiments. Closed loop ESC environment 418 is shown to include components that are the same as or similar to components of FIG. 4A. In closed loop ESC environment 418 setpoint signal generator 401 can optionally provide setpoint signal 402 to aggregator 404 and/or system 408. Once setpoint signal generator 401 provides a signal to aggregator 404, a dither signal from dither signal generator 405 can be added to setpoint signal 402 to obtain a dithered setpoint signal z(t). Aggregator 404 can provide z(t) to archive 412 and BMS controller 366 of system 408, which can analyze dithered setpoint signal z(t) and provide configuration data to plant 411 based on the dithered setpoint signal. Plant 411 can provide output y(t), performance variable data, from system 408, to archive 412 with data tags indicating which data point of dithered setpoint signal z(t) is associated with performance variable values y(t). Performance assessment system 414 can aggregate and analyze performance variable values y(t) versus dithered setpoint input z(t) data from archive 412 and determine a change in setpoint that could bring performance variable to an extremum. Performance assessment system 414 can optionally send a signal to setpoint signal generator 401 to update the setpoint based on the determined change.

Performance assessment system 414 can retrieve the performance data from archive 412 and determine a change in setpoint signal r(t) that setpoint signal generator 401 is providing by calculating a Newton step, or change in the setpoint signal. In some embodiments, performance assessment system 414 can do so by applying one or more demodulation signals to the performance data. One demodulation signal can be associated with a Hessian matrix associated with a cost function. Another demodulation signal can be associated with a signal that varies sinusoidally with time, for example, and can be associated with a gradient vector of the cost function. It should be understood that a Hessian matrix is an example and that any matrix of any Hessian order can be used to calculate the Newton step. Further, the demodulation signals can be associated with any function. In some embodiments, the Hessian matrix can be associated with cost functions of multiple variables (i.e. room temperature and air flow values of a room). In some embodiments, each variable associated with the system can be associated with a different cost function and a different Hessian matrix. Consequently, setpoint signal generator 401 can provide multiple setpoint signals, or a setpoint signal having multiple values in a vector, to adjust building equipment configurations associated with each variable and/or cost function. Applying the demodulation signals after receiving system output 410 can provide valuable data regarding changes in configuration of building equipment, resulting from a change in setpoint, that will improve the performance of the building equipment. In some embodiments, signals can be received from multiple pieces of building equipment and performance assessment system 414 can determine Newton steps for each piece of building equipment. Performance assessment system 414 can send a signal to setpoint signal generator 401 indicating to implement the Newton step in setpoint signal r(t) so plant 411 can operate more efficiently.

In some embodiments, performance assessment system 414 sends a signal to setpoint signal generator 401 to apply a Newton step after performing a cost benefit analysis to determine if a determined change in setpoint would positively impact the building. For example, performance assessment system 414 can determine that HVAC building equipment operates most efficiently when operating to keep a room temperature of a room at 80 degrees. However, occupants of a room may deem 80 degrees to be uncomfortable, so setting the setpoint to 80 degrees may not be worth any energy savings changing the setpoint can provide. In some embodiments, performance assessment system 414 can automatically determine, using predetermined ranges and thresholds, whether to apply the Newton step to setpoint signal 402 after it is calculated. If a setpoint resulting from a Newton step is outside of the predetermined range or not above a threshold, performance assessment system 414 may not send a signal to setpoint signal generator 401 to update the setpoint signal with the determined Newton step. If the setpoint is within the predetermined range or above the threshold, performance assessment system 414 can send a signal to setpoint signal generator 401 to update the setpoint signal. In some embodiments, performance assessment system 414 calculates the Newton step and provides data associated with the Newton step (i.e., the change in setpoint and any cost benefits associated with the change) to an administrator via computing device 416. The administrator can determine if performance assessment system 414 should change the setpoint signal that setpoint signal generator 401 is providing.

In some embodiments, instead of using demodulation signals, performance assessment system 414 can determine Newton steps for one or more setpoints using a least squares technique. The least squares technique can be implemented by aggregating the data received as a result of a dither signal being applied to a setpoint signal into an output vector. Each data point in the output vector can be an output associated with the dithered setpoint signal input as a function of time. The data can be gathered for a user-defined time period, and the user-defined time period can be of any duration. Once performance assessment system 414 has obtained each data point within a user-define time period and created an output vector with the data, performance assessment system 414 can determine a Hessian matrix and a gradient vector associated with the output vector to determine Newton steps.

Figure 5:
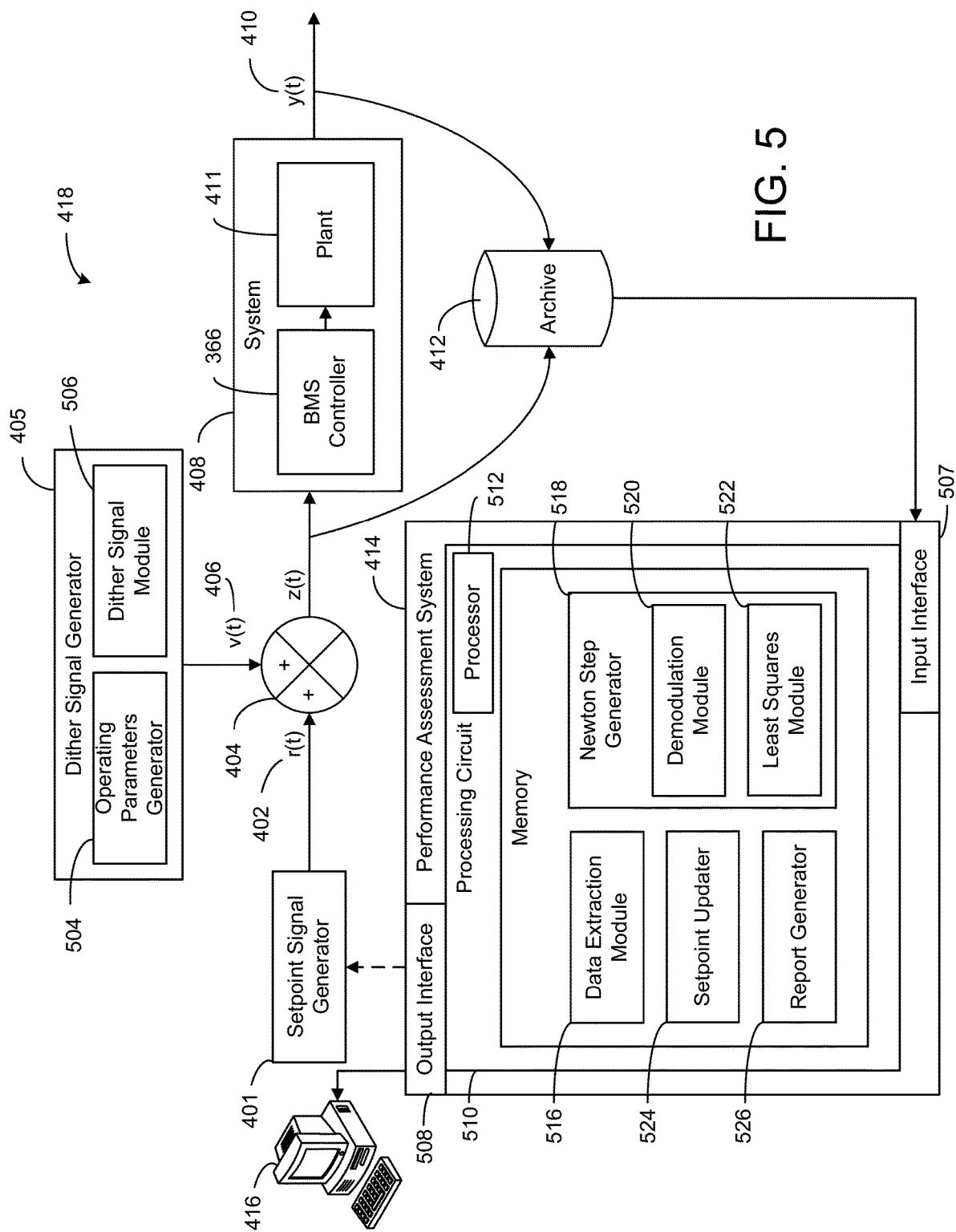
FIG. 5 is a detailed block diagram of the closed loop ESC environment of FIG. 5B implementing the closed loop Newton based ESC monitoring and control strategy with the performance assessment system, according to some embodiments.

Referring now to FIG. 5, a detailed block diagram of closed loop ESC environment 418 implementing the closed loop Newton based ESC monitoring and control strategy with performance assessment system 414 is shown, according to some embodiments. Dither signal generator 405 is shown to include an operating parameters generator 504 and a dither signal module 506, in some embodiments. Dither signal generator 405 can operate to provide dither signals to a setpoint signal generated by setpoint signal generator 401 to obtain a dithered setpoint signal z(t). The dithered setpoint signal can be provided as an input to system 408 so BMS controller 366 can operate plant 411 based on the dithered setpoint, z(t), and to the output, y(t), which can be archived in archive 412. Performance assessment system 414 can retrieve data from archive 412, determine a Newton step based on the data, and generate a report including the Newton step. In some embodiments, performance assessment system 414 is connected to setpoint signal generator 401. Performance assessment system 414 can send a signal to setpoint signal generator indicating for setpoint signal generator to apply the Newton step to the setpoint signal r(t).

Dither signal generator 405 is shown to include an operating parameters generator 504 and a dither signal module 506. Dither signal generator 405 can provide dither signals 406 having any frequency, shape, and amplitude to setpoint signal 402. Operating parameters generator 504 can be configured to generate one or more operating parameters used by performance assessment system 414, in some embodiments. In some embodiments, operating parameters generator 504 generates frequency values and amplitude values for the dither signals generated by dither signal module 506. In some embodiments, dither signal generator 405 operates as a component of performance assessment system 414.

Dither signal module 506 can be configured to generate one or more dither signals for use in perturbing the setpoint signal r(t) provided to system 408, in some embodiments. Each dither signal has an amplitude and a dither frequency. The dither frequency for a dither signal can be selected such that no two dither signals have the same dither frequency. For example, a dither signal can have a first frequency and a second dither signal can have a second frequency $f_2$, where the first frequency is different from the second frequency. Advantageously, using multiple different dither frequencies allows the effect of each dithered setpoint input z(t) on the system output y(t) to be independently observed and used to optimize the setpoint. In some embodiments, the values of the dither amplitudes and/or the dither frequencies are determined by operating parameters generator 504. Dither signal module 506 can retrieve such values from operating parameters generator 504 and use the values to generate the dither signals.

Dither signal module 506 can be configured to generate perturbed control inputs z(t) using the generated dither signals. For example, dither signal module 506 can generate a perturbed setpoint signal z(t) by adding a dither signal v(t) to the setpoint signal r(t) provided by setpoint signal generator 401. In some embodiments, dither signal module 506 modifies each signal of setpoint signal r(t) using a different dither signal having a different dither frequency. Dither signal module 506 can provide the perturbed setpoint inputs z(t) to system 408. The output signal y(t) from system 408 can be a function of the perturbed setpoint signal z(t).

Still referring to FIG. 5 performance assessment system 414 is shown to include an input interface 507 and an output interface 508. Interfaces 507 and 508 can be or include any number of jacks, wire terminals, wire ports, wireless antennas, or other communications interfaces for communicating information and/or setpoint signals. Interfaces 507 and 508 can be the same type of devices or different types of devices. For example, input interface 507 can be configured to receive an analog feedback signal (e.g., an output variable, a measured signal, a sensor output, a controlled variable) from archive 412 and/or system 414 (although not shown). Output interface 508 can be a digital output (e.g., an optical digital interface) configured to provide a digital signal to setpoint signal generator 401. In other embodiments, output interface 508 is configured to provide an analog output signal.

In some embodiments interfaces 507 and 508 can be joined as one interface rather than two separate interfaces. For example, input interface 507 and output interface 508 can be combined as one Ethernet interface configured to receive network communications from archive 412. In some embodiments, a supervisory controller (not shown) provides both a setpoint and process feedback via an Ethernet network. In such an embodiment, output interface 508 can be specialized for a controlled process component of system 408. In yet other embodiments, output interface 508 can be another standardized communications interface for communicating data or setpoint signals. Interfaces 507-508 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Still referring to FIG. 5 performance assessment system 414 is shown to include a processing circuit 510 having a processor 512 and memory 514. Processor 512 can be a general purpose or specific purpose processor, an application specific integrated circuit (ASIC), one or more field programmable gate arrays (FPGAs), a group of processing components, or other suitable processing components. Processor 512 is configured to execute computer code or instructions stored in memory 514 or received from other computer readable media (e.g., CDROM, network storage, a remote server, etc.).

Memory 514 can include one or more devices (e.g., memory units, memory devices, storage devices, etc.) for storing data and/or computer code for completing and/or facilitating the various processes described in the present disclosure. Memory 514 can include random access memory (RAM), read-only memory (ROM), hard drive storage, temporary storage, non-volatile memory, flash memory, optical memory, or any other suitable memory for storing software objects and/or computer instructions. Memory 514 can include database components, object code components, script components, or any other type of information structure for supporting the various activities and information structures described in the present disclosure. Memory 514 is shown to include a data extraction module 516, a least squares module 522, a setpoint updater module 524, and a report generator 526. Memory 514 can be communicably connected to processor 512 via processing circuit 510 and can include computer code for executing (e.g., by processor 512) one or more processes described herein.

Memory 514 is shown to include data extraction module 516. Data extraction module 516 can be configured to extract data from an output y(t) of system 408. Data extraction module can extract the data from archive 412 or directly from system 408. The data can include values of variables associated with different pieces of building equipment (e.g. a supply air value received from an AHU, and other values from other pieces of building equipment). The data can also include a performance measure indicating how efficiently the building equipment is operating (e.g. the total power an air handler uses including fans, compressors, pumps, etc.). Data extraction module 516 can extract any sort of data from any piece of building equipment within system 408. After extracting the data, data extraction module 516 can store the data in a database within memory 514 in a table and/or as a vector. The database can be the same or similar to archive 412. When storing the data, data extraction module 516 can tag the data with a time stamp indicating when the data was taken and with a tag indicating what type of data it is (e.g. the data is a performance measure or a setpoint for a piece of building equipment).

In some embodiments, in addition to storing output y(t) data associated with different pieces of building equipment, data extraction module 516 can also store inputs z(t) in the same database. Data extraction module 516 can store the inputs in a table that matches outputs y(t) with a correlated input so a user reading data in the database can see the effects of adding setpoint inputs z(t) to system 408.

In some embodiments, data extraction module 516 can gather and store data associated with inputs and outputs to system 408 associated with dither signals generated by dither signal generator 405. Dither signal generator 405 can generate a dither signal that causes the input setpoint signal of system 408 to vary slightly around its associated setpoint. Data extraction module 516 can gather the input to system 408 including the dithered setpoint signal, the output around the setpoints for each piece of building equipment, and performance measures associated with the input and output. By collecting data from dithered setpoint signals that are unnoticeable to occupants of a building, data extraction module 516 can more easily gather performance measures for different input signals without disturbing occupants of a building.

In some embodiments, data extraction module 516 can be configured to obtain values of the performance variable based on the output signal y(t). In some instances, output signal 410 can be a performance variable of plant 411 indicating performance characteristics (e.g., power used, power generated, etc.). Data extraction module 516 can obtain values of the performance variable by identifying the values of the output signal from archive 412. Data extraction module 516 can sample different values of the output signal by identifying time stamps associated with the output signal in archive 412. Data extraction module 516 can also directly receive output signal 410 from system 408 and tag the signal with time stamps indicating when output signal 410 was received and/or values of the output signal were generated.

In some instances, the performance variable may be a function of the output signal. The output signal may be a setpoint generated by plant 411 of system 408. Data extraction module 516 may be configured to perform operations on the setpoint to determine values for the performance variable. For example, the setpoint of a room temperature may be 75 degrees. Data extraction module 516 can receive the room temperature and determine how much power plant 411 used to set the setpoint to 75 degrees. Data extraction module 516 can determine the values of the performance variable using internal equations determined by an administrator to determine performance variable values that are associated with the 75 degree setpoint. Data extraction module 516 can use any method to determine values of performance variables.

Still referring to FIG. 5, memory 514 is shown to include Newton step generator 518. In some embodiments, Newton step generator 518 can be configured to determine a Newton step, or a change in a setpoint of building, so the building equipment operating to obtain the setpoint can operate more efficiently, in some embodiments. Newton step generator 518 can determine the Newton step after determining a gradient of a cost function of y(t) and estimating a Hessian matrix related to the same cost function. Newton step generator 518 can determine the gradient and/or Hessian through a demodulation module 520 and/or a least squares module 522. After obtaining the gradient and the Hessian information from demodulation module 520 and/or least squares module 522, Newton step generator 518 can determine a Newton step using the gradient and the Hessian. In some embodiments, Newton step generator 518 operates in an open-loop system, so once Newton step generator 518 determines the Newton step, Newton step generator 518 can store the Newton step in a database that maintains Newton steps to be looked at and implemented by an administrator at any time. In other embodiments, however, Newton step generator 518 operates in a closed-loop system. In a closed-loop system, once Newton step generator 518 determines Newton steps, Newton step generator 518 can send a signal to setpoint updater module 524 indicating a change in the setpoint so building equipment of system 408 can operate more efficiently.

Advantageously, by operating in an open-loop system, Newton steps determined by Newton step generator 518 can allow administrators to see a degree of change in setpoints needed so the building equipment can operate more efficiently. Because the Newton step is not implemented into a feedback loop for the system, administrators can determine if they want to make the Newton step change. Further, even though Newton step generator 518 is operating in an open-loop system, an administrator can easily "close the loop" by adjusting performance assessment system 414 to connect to setpoint signal generator 401 to provide signals indicating for setpoint signal generator 401 to provide setpoint signals adjusted based on Newton steps determined by Newton step generator 518.

In some embodiments, to determine gradient and Hessian information for a piece of building equipment, Newton step generator 518 includes demodulation module 520.

Demodulation module 520 can be configured to determine the gradient and/or Hessian information for a data set generated from applying a dithered setpoint signal to system 408. For a brief overview, demodulation module 520 can receive the data extracted by data extraction module 516, apply demodulation signals to the data, and obtain gradient and Hessian information based on demodulated data. One demodulation signal can be implemented to determine a gradient, G, of the ESC. The demodulation signal can be a sine wave represented by the function:

$$M(t) = \left(\frac{2}{a_1}\sin(w_1 t) \ldots \frac{2}{a_N}\sin(w_N t)\right)$$

where $a_1 \ldots a_N$ can be any real number depending on what gradient is desired by the user and $w_1 \ldots w_N$ can be any number where $w_1/w_N$ is a rational number. N can be any number represented by the number of signals of an output y(t) of system 408. The gradient can be determined with the equation:

$$G=M(t)*y(t)$$

Demodulation module 520 can also determine an estimate of a Hessian matrix, H, that is associated with a cost function. A cost function can be a function associated with values associated a performance variable over time. The value of the performance variable can be represented by y(t). The performance variable can represent a performance metric (e.g., power generated, power used, etc.) of plant 411 of system 408. In an exemplary embodiment, the Hessian matrix is a second-order partial Hessian function of the cost function associated with an output of system 408 generated from an input. In some embodiments, H can be determined without knowing the cost function, which can be useful if the cost function is not readily available. A perturbation matrix, N(t), can be multiplied by data associated with output y(t) of system 408 to obtain an estimate of H. N(t) can be a signal associated with an n×n matrix represented by the following equations:

$$N_{i,i} = \frac{16}{a_i^2}\left(\sin^2(w_i t) - \frac{1}{2}\right)$$

-continued $$N_{i,j} = \left(\frac{4}{a_i a_j}\right)\sin(w_i t)\sin(w_j t), \ i \neq j$$

The values obtained for both $N_{i,i}$ and $N_{i,j}$ can be included in a perturbation signal associated with matrix N(t) and multiplied by y(t) to obtain an estimate of the Hessian for y(t). Accordingly, an equation to determine the estimate of the Hessian is denoted by the equation below:

Estimate of the Hessian=$N(t)*y(t)$

Because the equation above is an estimate of the Hessian, it can be beneficial to receive outputs after incorporating a dither signal for times of great duration. If the time that values are taken is long enough, the average value of the estimate of the Hessian can converge to the actual value of the Hessian. Consequently, using a dither signal for a long period of time can be useful to ensure the estimate of the Hessian is accurate.

After demodulation module 520 calculates a Hessian matrix, H, and a gradient, G, of a cost function associated with a dithered setpoint signal, Newton step generator 518 can calculate an inverse of the Hessian using standard techniques. Newton step generator 518 can then determine the Newton step using the equation:

Newton Step=$-H^{-1}G$

By applying values of y(t) generated from a dither signal to the equations shown above, administrators can easily determine changes in setpoint signals to apply to system 408 in an open-loop system. Performance assessment system 414 can send the Newton step to computing device 416 to generate a report at a user interface of computing device 416 including the Newton step and the data that was used to determine the Newton step. If NESC is being implemented in a closed-loop system, performance assessment system 414 can send a signal to setpoint signal generator 401 indicating a change in setpoint that would bring operation of plant 411 to an extremum.

In some embodiments, instead of using the demodulation signals to determine gradients and Hessian information of a dataset generated from applying dither signals to a setpoint signal, Newton step generator 518 can use a least squares technique through least squares module 522. Least squares module 522 can be configured to determine a gradient and a Hessian using dithered setpoint signal data, in some embodiments. In some embodiments, least squares module 522 can recursively implement the least squares Newton step estimation to obtain the most accurate Newton step. To implement the least squares Newton step estimation, least squares module 522 can receive data from data extraction module 516 generated after a dither signal has been added to a setpoint signal and used as an input into a system 408. Data extraction module 516 can extract output data from system 408 and least squares module 522 can take the output data and put it into vector form. For example, a setpoint signal, $r(t)=[r_1(t) \ r_2(t) \ r_3(t) \ldots r_m(t)]^T$, can be perturbed with a dither signal represented by $v(t)=[v_1(t) \ v_2(t) \ v_3(t) \ldots v_m(t)]^T$. m can represent the total number of variables being controlled by the setpoint signal. A dithered setpoint signal $z(t)=[z_1(t) \ z_2(t) \ z_3(t) \ldots z_m(t)]^T$ can be generated based on the equation $z(t)=r(t)+v(t)$ and used as an input into archive 412 and system 408.

After an input z(t) goes into system 408 and archive 412 and an output from system 408 is stored in archive 412, data extraction module 516 can extract output and input data from archive 412. Least squares module 522 can receive or retrieve the extracted data and determine the gradient and Hessian information of the data based on the least squares Newton step estimation includes determining the gradient and Hessian properties of y(z(t)), a cost function associated with z(t). y(z) can be represented by the following equation:

$$y(z) = \frac{1}{2} z^T A z + b^T z + c$$

The gradient vector for the output equation is Az+b where A is the Hessian. The calculation to determine the Newton step for this model is represented as Az in the following equation:

$$\Delta z = -A^{-1}(Az+b)$$

Y(z) can be redefined using the following equations:

$$y(z) = \frac{1}{2} vec(z^T A z) + b^T z + c$$

and $$y(z) = q^T \theta$$

where $$q^T = \begin{bmatrix} 1 & z^T & \frac{1}{2}(z^T \otimes z^T) \end{bmatrix}$$

and $$\theta = \begin{bmatrix} c \\ b \\ vec(A) \end{bmatrix}$$

Finally, the least-squares solution based on a set of data samples can be given by:

$$\theta_{estimate} = (Q^T Q)^{-1} Q^T Y$$

where $$Q^T = [Q_1 \ Q_2 \ \dots \ Q_N]$$

and $$y^T = [y_1 \ y_2 \ \dots \ y_N]$$

Using the equations listed above, A and b can be reconstructed from the estimated r to calculate the Newton step using the equation:

$$\Delta z = -A^{-1}(Az+b)$$

Newton step generator 518 can use either method described above to calculate the Newton step for different pieces of building equipment so they operate as efficiently as possible. Both methods can be implemented in a close-loop system and an open-loop system. The open-loop system can operate by passively observing an effect of the perturbed control input on the output signal without any additional perturbations to the control input after applying the dither signal. In the open-loop system, data is simply gathered from the input z(t) and the output y(t) of system 408 and input into either system described above to determine how to adjust operation of building equipment towards so it operates as efficiently as possible, or towards an extremum.

In some embodiments, instead of using a dither signal to process data and determine changes in pieces of building equipment, performance assessment system 414 can simply rely on data gathered during normal operation of the system without a dither signal. Even though system 408 can operate so building equipment provides a setpoint for different building characteristics, equipment may not always operate exactly as specified and have varying inputs and outputs. This is especially the case if an act of nature, such as a storm, a sudden decrease or increase in outside temperature, strong winds, etc., impacts a building. While a building can operate to bring the building characteristics back to a setpoint, it does not happen immediately, so a variation in data collected at the output of system 408 can appear as the building equipment operates to bring a building back to its setpoint. Thus, a "natural" dither signal can be identified as variations in the input setpoint signal that occur without an extra mechanical dither signal that slightly varies inputs to system 408. Consequently, data extraction module 516 can collect the data including how the building equipment is performing (i.e. the performance variable) and use the system and methods discussed herein to determine how to adjust the operation of the building equipment so the building equipment can operate more efficiently.

While implementing Newton-based extremum-seeking control can bring performance variables to their extremum more quickly and with less changes in configurations than other forms of extremum-seeking control, there can be instances where Newton step generator 518 can bring the building equipment configurations closer to their optimal configuration without getting to the optimal configuration. In these instances, Newton step generator 518 can operate recursively by repeating either method described above to bring the building equipment's configurations closer to a point where an associated performance variable reaches a desired extremum. Newton step generator 518 can repeat each method, respectively, until the performance variables are at the extremum, at which point Newton step generator 518 can stop performing the operations. In some embodiments, Newton step generator 518 can continuously generate new Newton steps for building equipment after a performance variable value has reached an extremum to ensure the building equipment continues to operate at its maximum efficiency and to account for any external changes to the system.

Advantageously, by using the Newton-based extremum-seeking control method described above, performance assessment system 414 can determine a change in a setpoint without knowing each and every value of a cost function for a performance variable of the building equipment. Because the method estimates the values of the Hessian, performance assessment system 414 only needs enough data from system 408 to generate a gradient and a Hessian matrix associated with the cost function instead of the actual cost function. Accordingly, performance assessment system 414 can determine changes in setpoint signals more quickly and with less data than other methods that need to continuously manipulate the setpoint before reaching a target setpoint to bring a gradient associated with the cost function is zero.

Further, the methods described above allow performance assessment system 414 to determine changes in a setpoint signal so building equipment can operate at an optimal point with fewer changes in setpoint or building equipment configurations. Performance assessment system 414 can do so because it does not need to recursively change configurations for the building equipment, determine if the configurations are optimal, and change the configurations again, repeating the process until the performance variable of the building equipment reaches an optimal extremum. Instead, performance assessment system 414 can determine impacts that new setpoint signals can have on the performance variable and any costs (e.g. undesired increases or decreases in a value of a variable) before updating the setpoint signals with a determined Newton step.

Finally, another advantage to using Newton-based extremum-seeking control is it can be used for any number of pieces of building equipment. All that is needed is performance variable data and input data for each piece of building equipment. Performance assessment system 414 can determine changes in setpoints for variables that are impacted by the pieces of building equipment.

Still referring to FIG. 5, memory 514 is shown to include setpoint updater module 524. Optionally, performance assessment system 414 can be connected to setpoint signal generator 401 to send signals to adjust setpoint signals r(t) generated by setpoint signal generator 401. Setpoint updater module 524 can be configured to receive Newton steps generated by Newton step generator 518 and send a signal to setpoint signal generator 401 indicating to adjust setpoint signal r(t) accordingly, in some embodiments. The adjustment can drive values of a performance variable associated with devices of plant 411, such as power used, to an extremum (e.g. a minimum or a maximum). Setpoint updater module 524 can update setpoints for any number of variables associated with building equipment of system 408. When operating in an open-loop system, however, setpoint updater module 524 may not be able to send a Newton step from Newton step generator 518 because performance assessment system 414 is not connected to setpoint signal generator 401.

In some embodiments, setpoint updater module 524 does not automatically update setpoints generated by signal generator 401 after receiving a Newton step generated by Newton step generator 518. In these embodiments, setpoint updater module 524 can determine whether or not to adjust the setpoint as determined by the Newton step. This is beneficial if an administrator does not desire for performance assessment system 414 to automatically adjust setpoint signals to system 408 in cases where using the Newton step would cause conditions of a building to be uncomfortable for occupants of the building. For example, data extraction module 516 may extract data from archive 412 associated with a room temperature of a building, which is at a steady state setpoint value of 70 degrees. Newton step generator may determine a Newton step based on the data and determine that for the building equipment of system 408 to be operating at an optimal efficiency, the temperature must rise by 10 degrees to 80 degrees. The administrator of the building does not necessarily want to cause the temperature to rise by 10 degrees in the building, so the administrator may want to keep the setpoint temperature where it is at 70 degrees, even if it is not optimally efficient.

In some embodiments, to determine whether or not to update the signal based on a generated Newton step, setpoint updater module 524 can implement predetermined ranges that are determined by an administrator. Setpoint updater module 524 can determine what the setpoint would be after being updated by applying a Newton step. If setpoint updater module 524 determines that adjusting a setpoint signal by a Newton step would bring the setpoint out of a predetermined range, setpoint updater module 524 may not update the setpoint signal with the generated Newton step. In some embodiments, if a setpoint signal could remain in a predetermined range upon being updated by setpoint updater module 524 with a Newton step, setpoint updater module 524 could update the setpoint signal generated by setpoint signal generator 401. For example, if an administrator sets a predetermined range of acceptable values to be between 65 and 75 degrees and setpoint updater module 524 determines that applying a Newton step would bring the temperature setpoint to 77 degrees, setpoint updater module 524 can determine not to update the setpoint signal generated by setpoint signal generator 401. If the Newton step brings the setpoint to 73 degrees, however, setpoint updater module 524 can automatically update the setpoint signal. Setpoint updater module 524 can update the setpoint signal generated by setpoint signal generator 401 any number of times so building equipment of system 408 can operate efficiently.

Report generator 526 can be configured to generate a report including data associated with the Newton step determined by Newton step generator 518. Report generator 526 can receive Newton steps from Newton step generator 518 and generate a report including the Newton step and/or the data used to generate the Newton step. Report generator 526 can send the report to an external computer (e.g., computing device 416) where the report can be displayed. An administrator can view the report and adjust the setpoint being provided by setpoint signal generator 401 based on the report.

Figure 6:
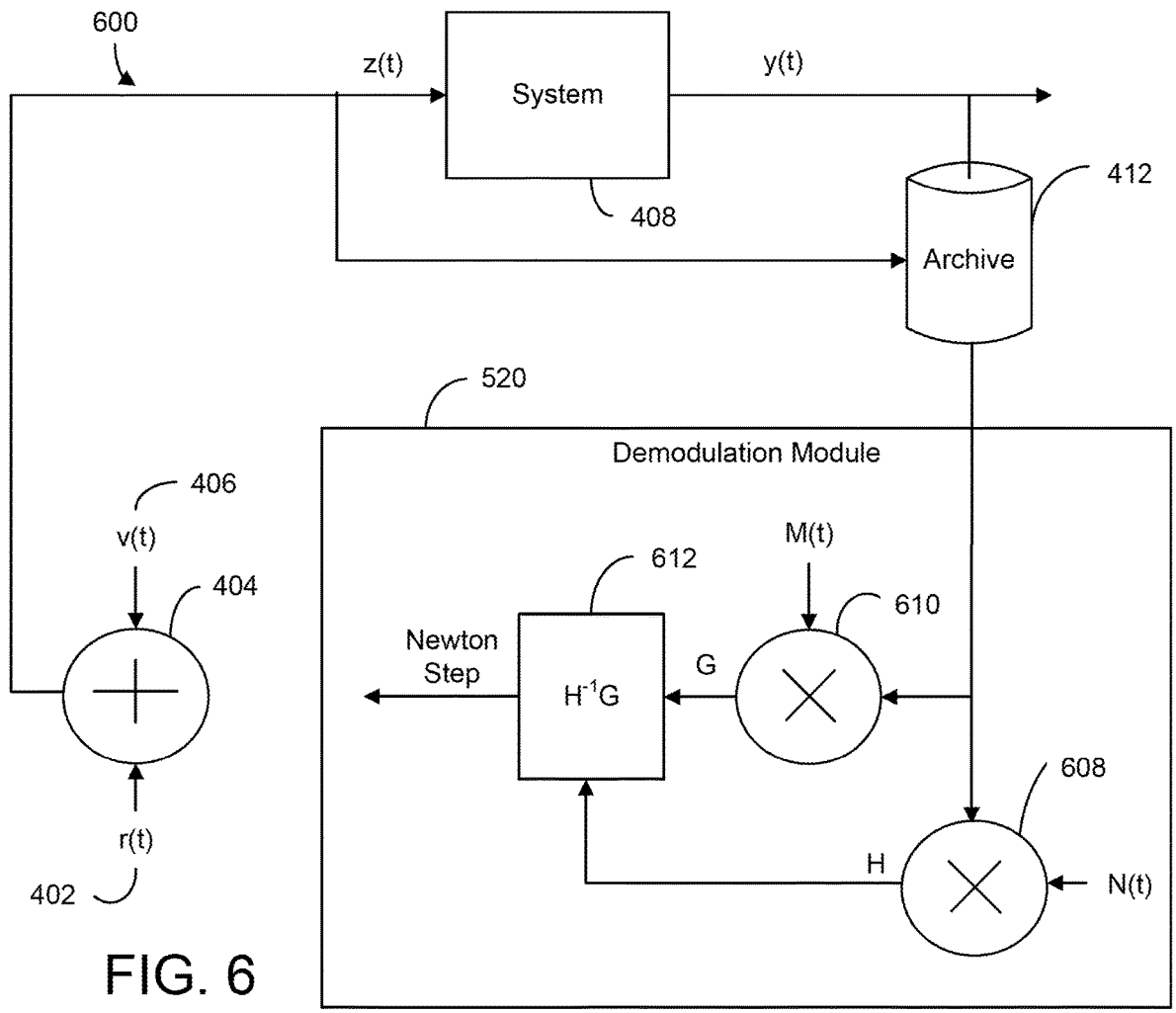
FIG. 6 is a block diagram illustrating the performance assessment system implementing demodulation signal to determines a gradient vector and a Hessian matrix, according to some embodiments.

Referring now to FIG. 6, a block diagram illustrating how demodulation module 520 of performance assessment system 414 determines Newton steps by implementing modulation signals to archived data generated as a result a dithered setpoint signal being applied to a system 604 is shown, according to an exemplary embodiment. Steady state setpoint signal 402 is shown being added to dither signal 406 by aggregator 404, in some embodiments. A dithered setpoint signal z(t) is then used as an input into system 408 and archive 412, in some embodiments. y(t) is an output resulting from dithered setpoint signal z(t) into system 408 and can represent values of a performance variable associated with building equipment within system 408 based on how the building equipment operates based on the dithered setpoint signal z(t). Demodulation module 520 can retrieve the performance variable data from archive 412 after data extraction module 516 retrieves the data and determine a Newton step based on the data.

Demodulation module 520 is shown to include multipliers 608 and 610 and a Newton step determination equation 612 that can be used to determine Newton steps. Demodulation module 520 can apply demodulation signal M(t) to multiplier 610 to multiply M(t) by performance variable data extracted from archive 412 to obtain a gradient of the extracted data. M(t) can be the same or similar to M(t) as described with reference to FIG. 5. Demodulation module 520 can apply demodulation signal N(t) to multiplier 608 to multiply N(t) by the performance variable data extracted from archive 412 to obtain a Hessian associated with the data. Demodulation module 520 can determine the inverse of the Hessian and then multiply the inverse of the Hessian at Newton step determination equation 612 to determine a Newton step to bring building equipment of system 408 operating closer to an efficiency extremum.

Figure 7:
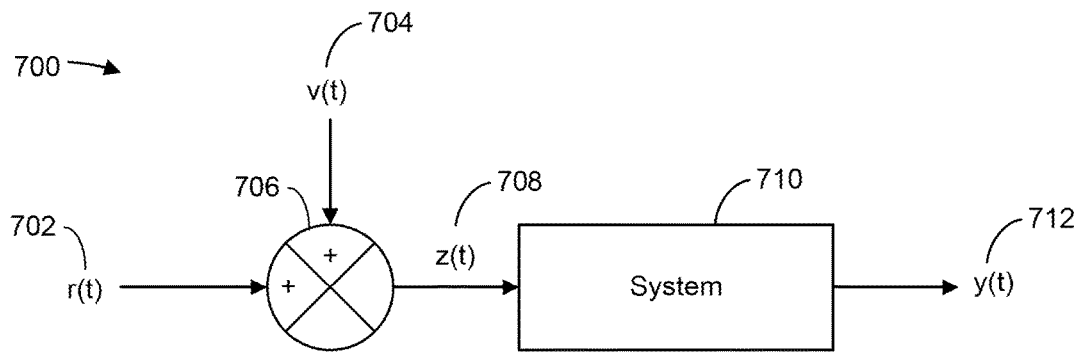
FIG. 7 is a block diagram illustrating a setpoint signal and a dither signal being applied to a building system and different variables that are used when the performance assessment system determines a Newton step using a least squares technique based on the different variables, according to some embodiments.

Referring now to FIG. 7, a block diagram illustrating an open loop ESC environment 700 from which to gather and extract data is shown, according to an exemplary embodiment. In some embodiments, the data can be used to determine a Newton step for a setpoint signal of a building by implementing a recursive least square Newton step estimation. Open loop ESC environment 700 includes components that are the same as or similar to components shown and described with reference to FIG. 5. Open loop ESC environment 700 includes an input setpoint signal 702, a dither signal 704, an aggregator 706, an aggregator output 708, a system 710, and a system output 712. Input setpoint signal 702 and dither signal 704 are shown to be inputs into aggregator 706, which provides aggregator output 708 to system 710. System 710 is similar to system 408, shown and described in reference to FIG. 5, and provides system output 712. Input setpoint signal 702 is shown to be represented by r(t) and dither signal is shown to be represented by v(t). Aggregator output 708 is shown to be represented by z(t)=r(t)+v(t) and system output 712 is shown to be represented by y(t).

Although not shown, data extraction module 516, shown and discussed in reference to FIG. 5, can extract data from aggregator output 708 and system output 712. Data extraction module 516 can store the data in a database and indicate which system output 712 correlate to which aggregator output 708. Data extraction module 516 can do so by tagging the data indicating that they are associated with each other or put them in a table that indicates they match with each other.

After extracting the data, components of performance assessment system 414 can use a least square Newton step estimation to determine a change in setpoint to provide to system 710 so building equipment of system 710 can operate more efficiently. Performance assessment system 414 can do so through Newton step generator 518 after receiving data gathered as a result of a dithered setpoint signal being provided to system 710, putting the data in vector form, and calculating a gradient and Hessian matrix associated with performance variable data gathered from system 710 after the dithered setpoint signal is applied to system 710. In some embodiments, instead of using the least square Newton step estimation, performance assessment system 414 can use demodulation signals to determine the gradient and the Hessian matrix.

Figure 8:
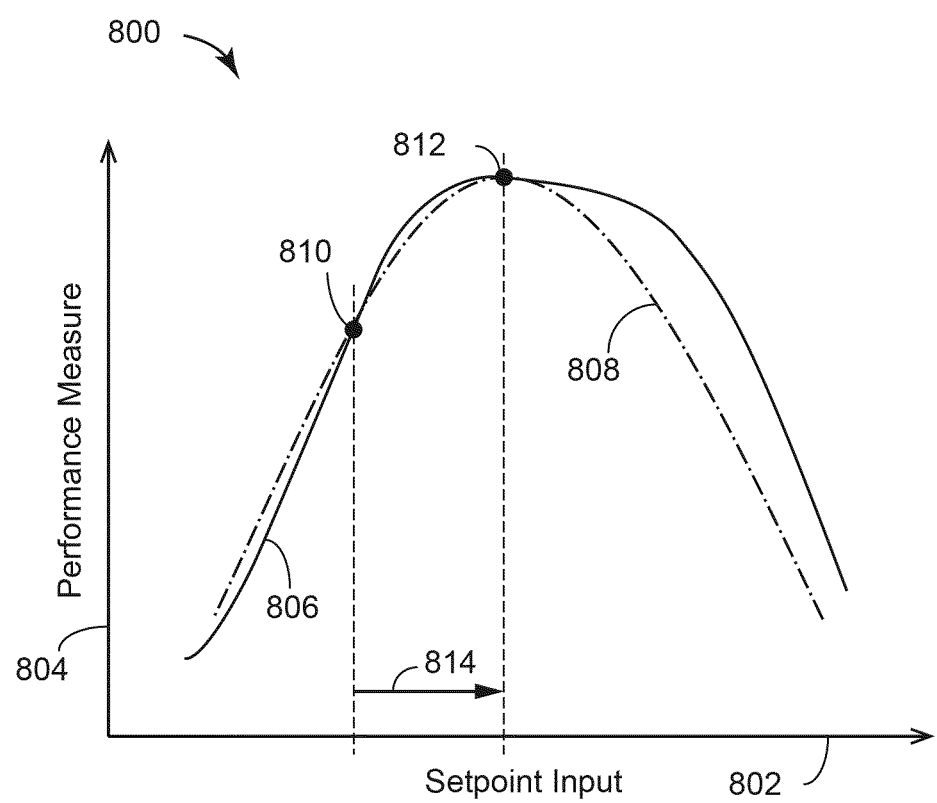
FIG. 8 is a graph comparing a quadratic approximation of a cost function with an actual cost function of a performance measure and a setpoint input, according to some embodiments.

Referring now to FIG. 8, a graph 800 comparing a quadratic approximation 808 of a cost function 806 with a performance measure 804 of a setpoint input 802 is shown, according to an exemplary embodiment. Graph 800 shows an output for a performance measure 804 as a function of a setpoint input 802. Two different functions are shown, actual cost function 806 which represents data collected by data extraction module 516, shown and described in reference to FIG. 6, and quadratic approximation 808. While actual cost function 806 shows a full line similar to quadratic approximation 808 of cost function 806, performance assessment system 414 can determine the Hessian and gradient of the cost function with less data and without determining the cost function or an approximation of the cost function.

Referring still to FIG. 8, a Newton step 814 is shown between a current operating point 810 and an ideal operating point 812. Newton step 814 can represent the change in a setpoint signal that will bring a performance measure, or performance variable, of building equipment from current operating point 810 to ideal operating point 812. As discussed above, Newton step 814 can be determined by determining a gradient of data provided after applying a dither signal to a system and a Hessian matrix. Performance assessment system 414 can determine a change in setpoint by multiplying the gradient by an inverse of the Hessian matrix.

Figure 9:
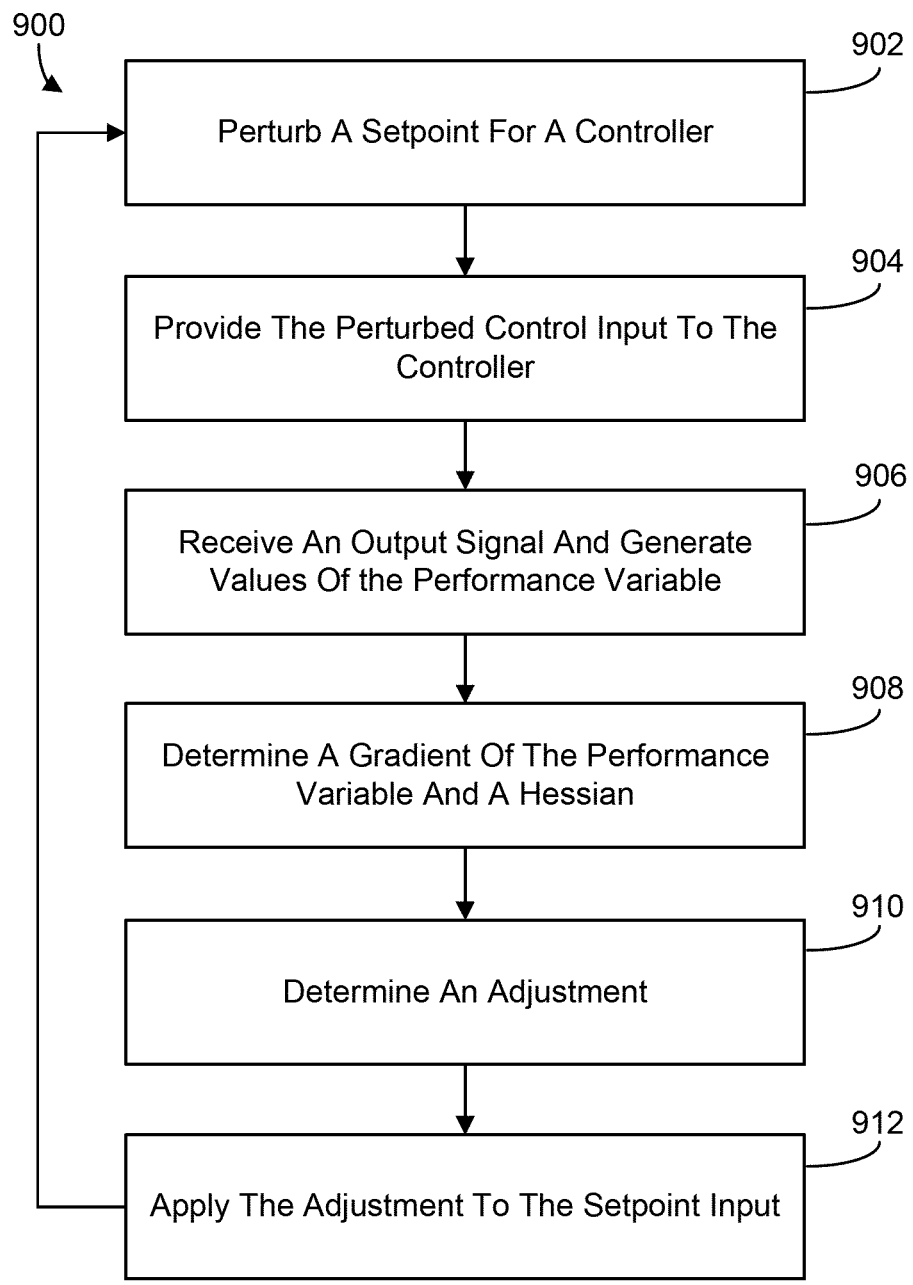
FIG. 9 is a flowchart of a process for regulating setpoint signals so building equipment can operate efficiently using Newton-based extremum-seeking control, according to some embodiments.

Referring now to FIG. 9, a flowchart of a process 900 for regulating a setpoint signal affected by a performance assessment system, shown and described with reference to FIG. 5, using Newton-based extremum-seeking control is shown, according to an exemplary embodiment. Process 900 can be performed by performance assessment system 414 and dither signal generator 405. In some embodiments, dither signal generator 405 is a component of performance assessment system 414.

Process 900 is shown to include perturb a setpoint input for a controller (step 902). The controller can be the same or similar to system 366 of system 408. The controller can control building equipment in a system based on setpoint signals the controller receives. Perturbing can be done with a small dither signal that only slightly varies setpoints of a setpoint signal. In some embodiments, the dither signal is a sinusoidal periodic wave, but it can be a pseudo random-noise signal or take any form. For example, a performance assessment system can identify a perturbation signal that slightly varies a setpoint signal into a controller that controls building equipment based on the setpoint signal so occupants of a building may not be able to notice the effects of the dither signal. When perturbing the setpoint signal with the dither signal, values of the dither signal can be added to the setpoint input. Further, in some embodiments, the setpoint signal can be automatically perturbed by natural forces such as natural events. Natural forces can provide a "natural dither signal." In these embodiments, the setpoint input can vary slightly without any intent by an administrator applying the setpoint signal. Any number of setpoint signals can be perturbed.

Process 900 is shown to include provide the perturbed setpoint input to the controller (step 904). After perturbing the setpoint signal with the dither signal, the controller can operate building equipment based on the setpoint signal. The controller and the building equipment the controller controls can be a combination of a process and one or more mechanically-controlled outputs. The system can include any number of pieces of building equipment that operate according to setpoint signals received by the controller.

Process 900 is shown to include receive an output signal including values of the performance variable (step 906). The output signal can be a feedback signal from the system (e.g., system output y(t)) and can be received at a communication interface of a performance assessment system. In some embodiments, the output signal is a function of a plurality of setpoint signals to the system.

Process 900 is shown to include determine a gradient of the performance variable and a Hessian (step 908). A performance assessment system can determine the gradient and the Hessian in at least two manners. The performance assessment system can apply demodulation signals to data that was gathered as a result of applying dither signals to a steady state setpoint signal, or the performance assessment system can vectorize the data and determine the gradient and Hessian analytically. In some embodiments, the gradient is a vector and the Hessian information is a Hessian Matrix. Gradients and Hessians can be determined for any number of setpoint signals related to performance variables of any number of pieces of building equipment. Each performance gradient can be specific to a particular setpoint signal and can represent the slope of a performance curve defining the performance variable as a function of the setpoint signal.

The performance curve can have an extremum (e.g., a minimum or a maximum) when the performance gradient (i.e., the slope of the performance curve) is zero. The performance variable can be optimized for each control input by determining a Newton step for the setpoint input that causes building equipment to change configurations so the gradient vector is driven to zero, thereby moving the performance variable toward the extremum.

Process 900 is shown to include determine an adjustment (step 910). After determining the gradient and the Hessian information, the performance assessment system can determine a Newton step by multiplying the gradient with an inverse of the Hessian. When operating in a closed loop environment, the performance assessment system can determine whether to apply the Newton step to the signal by determining if, after applying the Newton step to an associated setpoint signal, an adjusted setpoint signal would remain within a predetermined range. If applying the Newton step to the setpoint signal would bring the setpoint out of the predetermined range, the performance assessment system may not apply the Newton step to the setpoint signal. If the setpoint signal would remain in range, however, at step 912, the performance assessment system can automatically adjust the setpoint signal based on the generated Newton step. In some embodiments, if the performance assessment system is operating in an open loop environment, the performance assessment system can determine the Newton step and allow an administrator to adjust the control signal instead of automatically adjusting the setpoint signal based on if the setpoint remains in a predetermined range. The performance assessment system can passively observe an effect of the perturbed control input on the output signal without adding additional perturbations to the control input after applying the dither signal. The performance assessment system can repeat process 900 as many times as is necessary so the building equipment can operate as efficiently as possible and continue to operate that efficiently.

Figure 10:
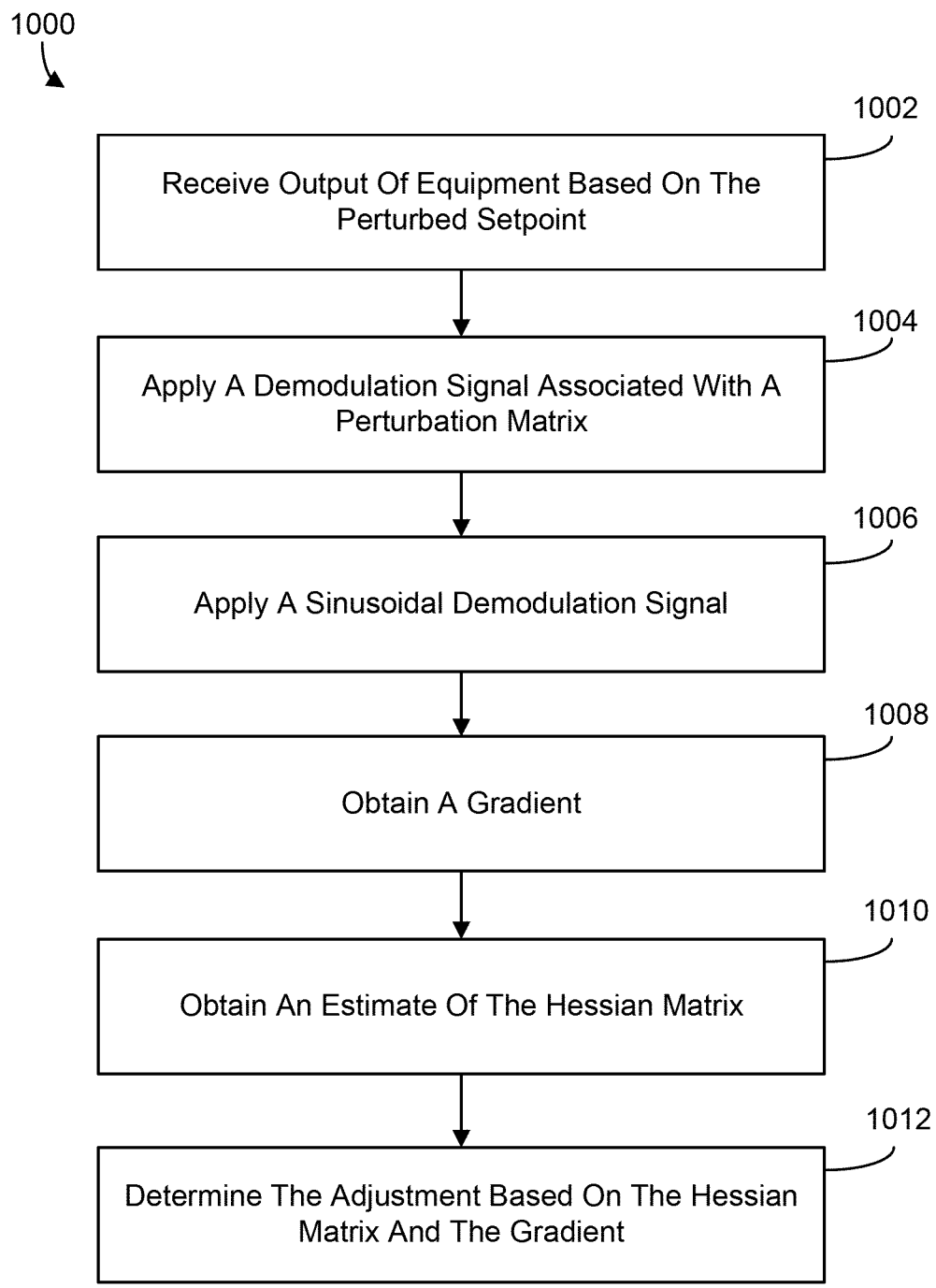
FIG. 10 is a flowchart of a process for determining the Newton step using demodulation signals, according to some embodiments.

Referring now FIG. 10, a flowchart of a process 1000 for determining a Newton step using Newton-based extremum-seeking control is shown, according to an exemplary embodiment. Process 1000 can be performed by performance assessment system 414, as described with reference to FIG. 5.

Process 1000 is shown to include receive output of equipment based on the perturbed setpoint signal (step 1002). Step 1002 can be the same or similar to step 906 of process 900. The output can include both performance data indicating how building equipment is performing under its configuration as a result of the perturbed input along with data indicating the output of the building equipment (e.g. air flow, temperature, air pressure, etc.).

Process 1000 is shown to include apply a demodulation signal associated with a perturbation matrix (step 1004). For example, the perturbation matrix can be an n×n matrix with diagonal components being represented by the equation:

$$N_{i,i} = \frac{16}{a_i^2}\left(\sin^2(w_i t) - \frac{1}{2}\right)$$

The non-diagonal based components can be represented by the equation:

$$N_{i,j} = \left(\frac{4}{a_i a_j}\right)\sin(w_i t)\sin(w_j t), \; i \neq j$$

The signal can last for any period of time. The longer the period of time, however, the more values the controller can receive and the more accurate the estimate of the Hessian will be.

Process 1000 is shown to include apply a sinusoidal demodulation signal (step 1006). The sinusoidal demodulation signal can be represented by the equation:

$$M(t) = \left(\frac{2}{a_1}\sin(w_1 t) \; ... \; \frac{2}{a_n}\sin(w_n t)\right)$$

In some embodiments, any sinusoidal signal can be used to determine the gradient.

Process 1000 is shown to include obtain an estimate of the gradient (step 1008). By multiplying M(t) with the output y(t) associated with the cost function, an estimate of the gradient can be obtained.

Process 1000 is shown to include obtain the estimate of the Hessian matrix (step 1010). Similar to obtaining an estimate of the gradient, an estimate of the Hessian matrix can be obtained by multiplying values of output signal y(t) with perturbation matrix N(t). The resulting matrix is an estimate of the Hessian matrix.

Process 1000 is shown to include determine the adjustment based on the Hessian matrix and the gradient (step 1012). At step 1012, the performance assessment system can determine the adjustment after determining the inverse of the determined Hessian matrix. The inverse of the determined Hessian matrix can be determined using any techniques. Once the inverse of the Hessian matrix is determined, the inverse can be multiplied by the gradient to obtain the Newton step.

Figure 11:
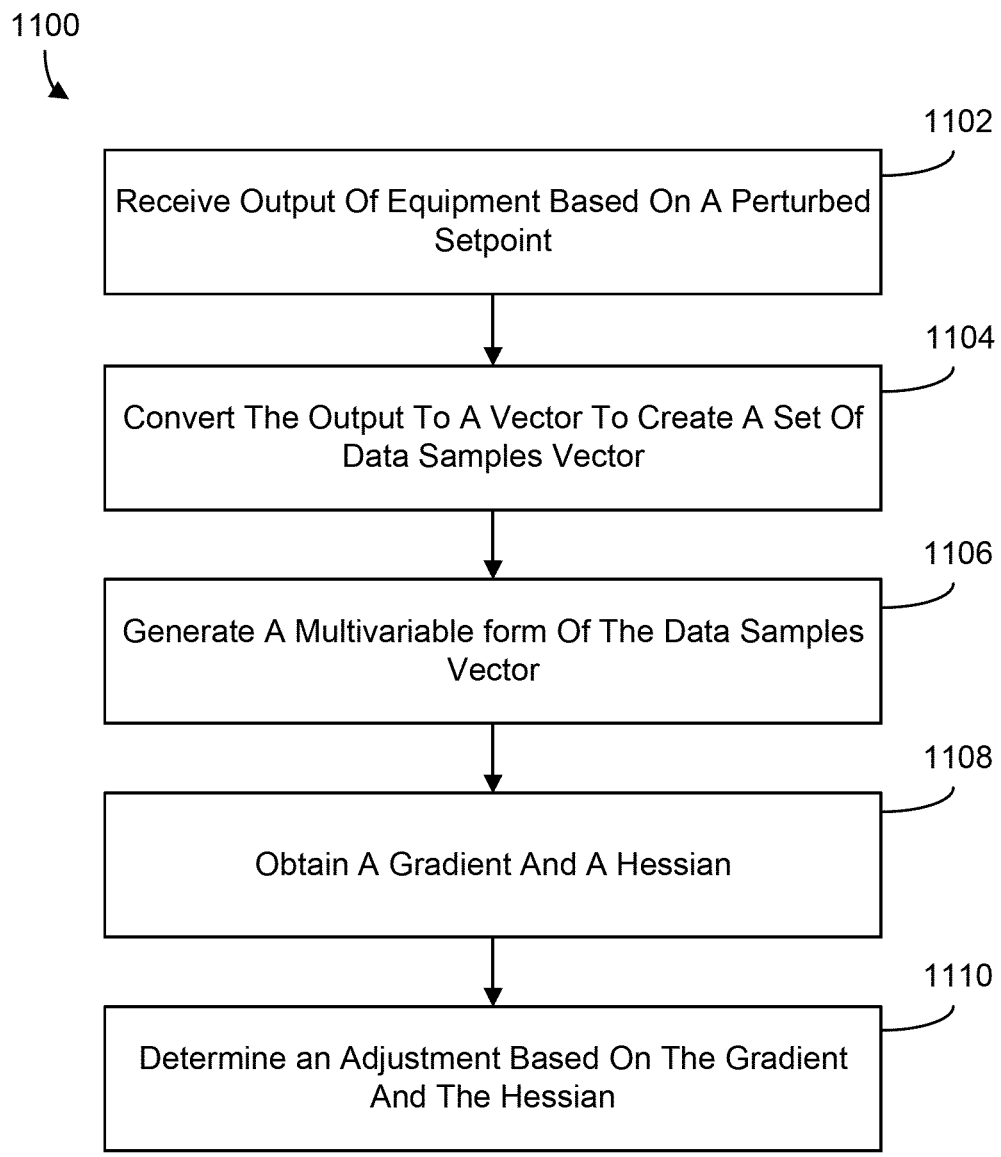
FIG. 11 is a flowchart of a process for determining the Newton step using a least squares Newton step technique, according to some embodiments.

Referring now to FIG. 11, a flowchart of a process 1100 for determining a Newton step using least squares Newton step estimation is shown, according to an exemplary embodiment. Process 1000 can be performed by performance assessment system 414, as described with reference to FIGS. 5B-6.

Process 1100 is shown to include receive output of equipment based on the a perturbed setpoint input (step 1102). Step 1102 can be the same or similar to steps 1002 and/or 902 of processes 1000 and/or 900 respectively. After a dither signal is applied to perturb the setpoint signal, the perturbed setpoint input can be input into a system the same as or similar to system 408 FIG. 5. Dither signals can be applied to any number of setpoint signals. Each setpoint signal can be associated with a different characteristic of a building.

Process 1100 is shown to include convert the output to a vector to create a set of data samples vector (step 1104). Data samples can be extracted from the output of the equipment of the system after a dithered setpoint signal is used as an input into the system. The data samples preferably include performance variable data indicating different performance characteristics of a piece of building equipment of the system, in some embodiments. For example, the data samples can include information about how much power a VAV box is using in conjunction with an AHU and a fan to keep a building's temperature at a user specified setpoint. In some embodiments, the data samples also include dithered setpoint values.

Process 1100 is shown to include generate a multivariable form of the data samples vector using a least squares technique (step 1106). The least squares technique can be implemented by manipulating the vector of the cost function associated with the values in the vector determined in step 1104 into a general multivariable form, such as a quadratic form. At a step 1108, obtain a gradient and a Hessian, the performance assessment system can obtain a gradient and a Hessian matrix based on the multivariable form. At a step 1110, determine an adjustment based on the gradient and the Hessian, the gradient can be multiplied by an inverse of the Hessian to determine a Newton step that can bring a performance variable to an extremum if applied to an associated setpoint signal.

In an exemplary embodiment of the systems and methods described herein, a user may attempt to determine an optimal performance configuration for an air handling unit of a building that delivers air at a constant temperature setpoint. The setpoint may be 55 degrees, but the user can make the setpoint any temperature. A dither signal generator can apply a dither signal to an air handling unit, slightly adjusting the temperature around the 55 degree setting. The dither signal can be sinusoidal or any other type of signal such as, but not limited to, a random noise signal. Further, the dither signal can have a small amplitude so occupants of the building do not realize that the temperature is varying or become uncomfortable in an undesirable temperature.

After the dither signal generator applies a dither signal, a performance assessment system can compile data from an output of the AHU and can use either the demodulation technique or the least squares technique as described herein to determine a gradient of a cost function and a Hessian of the cost function. The performance assessment system can then determine a change in a setpoint signal that will enable the building equipment to operate at maximum efficiency, an increase of five degrees, for example, and report how much energy could be saved by increasing the temperature by five degrees. The administrator can decide to increase the temperature setpoint signal by five degrees or have the setpoint signal remain the same.

In some embodiments, the performance assessment system operates in an open loop environment, so an administrator can manually adjust the performance assessment system output (e.g. the setpoint signal) so the AHU operates to generate a temperature setpoint of 60 degrees. In some embodiments, the performance assessment system is in a closed-loop ESC environment, however, so the performance assessment system can automatically adjust a setpoint signal using a calculated Newton step.

Advantageously, by implementing Newton-based extremum-seeking control to bring the cost function associated with a piece of building equipment to an extremum, a system implementing the processes described herein can bring the gradient of the cost function to zero more quickly than other methods and with less data. The system can use Newton-based extremum-seeking control strategies without knowing all the values of a cost function using either demodulation signals or a least squares method. If the system is operating in an open-loop environment, an administrator can analyze the data generated by the performance assessment system indicating what changes can be made to a setpoint signal so building equipment can operate more efficiently without necessarily changing the setpoint signal.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps can differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for operating and assessing performance of building equipment, the system comprising:
 a dither signal generator configured to:
  perturb a setpoint for a controller by applying a dither signal to the setpoint, resulting in a perturbed setpoint, and
  provide the perturbed setpoint to the controller, wherein the controller uses the perturbed setpoint to generate one or more control inputs for the building equipment, and the building equipment operate in accordance with the control inputs to affect a performance variable indicating a performance of the building equipment; and a performance assessment system configured to:
receive, from the building equipment, an output signal and obtain values of the performance variable based on the output signal, the values of the performance variable resulting from operating the building equipment based on the perturbed setpoint;
determine, from the values of the performance variable, a gradient of the performance variable with respect to the perturbed setpoint and a Hessian of the performance variable affected by the building equipment with respect to the setpoint;
determine an adjustment to the setpoint predicted to drive the performance variable to an extremum based on the gradient of the performance variable and the Hessian of the performance variable.

2. The system of claim 1, wherein the system is configured to determine the adjustment based at least on multiplying the gradient and an inverse of the Hessian of the performance variable.

3. The system of claim 1, wherein the system determines the gradient and the Hessian of the performance variable by passively observing an effect of the perturbed setpoint on the output signal without additional perturbations to the control input after the dither signal is applied.

4. The system of claim 1, wherein the performance assessment system is configured to apply the adjustment to the setpoint, the adjustment causing the controller to adjust an operation of the equipment to drive the performance variable to the extremum.

5. The system of claim 1, wherein the system is configured to determine the gradient of the performance variable and the Hessian of the performance variable by applying a plurality of demodulation signals to the output signal,
wherein one demodulation signal of the demodulation signals is associated with a perturbation matrix that generates an estimate of the Hessian, and
wherein a second demodulation signal of the demodulation signals is a sinusoidal signal that generates the gradient.

6. The system of claim 1, wherein the system is configured to determine the gradient of the performance variable and the Hessian of the performance variable by:
converting the values of the output signal to a vector to create a data sample vector;
generating a multivariable form of the data sample vector using a least squares technique; and
obtaining a gradient vector and the Hessian based on the multivariable form of the data sample vector.

7. The system of claim 6, wherein the system is configured to determine the adjustment based on recursively implementing the converting, generating, and obtaining operations until the performance variable reaches the extremum.

8. The system of claim 1, wherein the performance variable indicates a performance characteristic of the building equipment affected by the setpoint to the controller.

9. The system of claim 8, wherein the performance characteristic is a total power consumption of the building equipment affected by the setpoint to the controller.

10. A method for operating and assessing performance of building equipment, the method comprising:
perturbing a setpoint for a controller by applying a dither signal to the setpoint, resulting in a perturbed setpoint, and
providing the perturbed setpoint to the controller, wherein the controller uses the perturbed setpoint to generate one or more control inputs for the building equipment, and the building equipment operate in accordance with the control inputs to affect a performance variable indicating a performance of the building equipment;
receiving, from the building equipment, an output signal and obtaining values of the performance variable based on the output signal, the values of the performance variable resulting from operating the building equipment based on the perturbed setpoint;
determining, from the values of the performance variable, a gradient of the performance variable with respect to the perturbed setpoint and a Hessian of the performance variable affected by the building equipment with respect to the setpoint;
determining an adjustment to the setpoint predicted to drive the performance variable to an extremum based on the gradient of the performance variable and the Hessian of the performance variable.

11. The method of claim 10, wherein determining the adjustment is based at least on multiplying the gradient and an inverse of the Hessian of the performance variable.

12. The method of claim 10, wherein determining the gradient and the Hessian of the performance variable comprises passively observing an effect of the perturbed setpoint on the output signal without additional perturbations to the control input after the dither signal is applied.

13. The method of claim 10, comprising applying the adjustment to the setpoint, the adjustment causing the controller to adjust an operation of the equipment to drive the performance variable to the extremum.

14. The method of claim 10, wherein determining the gradient of the performance variable and the Hessian of the performance variable comprises applying a plurality of demodulation signals to the output signal,
wherein one demodulation signal of the demodulation signals is associated with a perturbation matrix that generates an estimate of the Hessian, and
wherein a second demodulation signal of the demodulation signals is a sinusoidal signal that generates the gradient.

15. The method of claim 10, wherein determining the gradient of the performance variable and the Hessian of the performance variable comprises:
converting the values of the output signal to a vector to create a data sample vector;
generating a multivariable form of the data sample vector using a least squares technique; and
obtaining a gradient vector and the Hessian based on the multivariable form of the data sample vector.

16. The method of claim 15, wherein determining the adjustment is based on recursively implementing the converting, generating, and obtaining operations until the performance variable reaches the extremum.

17. A non-transitory computer-readable storage medium having instructions stored thereon that, upon execution by a processor, cause the processor to perform operations to operate and assess performance of building equipment, the operations comprising:
perturbing a setpoint for a controller by applying a dither signal to the setpoint, resulting in a perturbed setpoint;
providing the perturbed setpoint to the controller, wherein the controller uses the perturbed setpoint to generate one or more control inputs for the building equipment, and the building equipment operate in accordance with the control inputs to affect a performance variable indicating a performance of the building equipment;

receiving, from the building equipment, an output signal and obtaining values of the performance variable based on the output signal, the values of the performance variable resulting from operating the building equipment based on the perturbed setpoint;

determining, from the values of the performance variable, a gradient of the performance variable with respect to the perturbed setpoint and a Hessian of the performance variable affected by the building equipment with respect to the setpoint; and determining an adjustment to the setpoint predicted to drive the performance variable to an extremum based on the gradient of the performance variable and the Hessian of the performance variable.

18. The non-transitory computer-readable storage medium of claim 17, wherein determining the gradient of the performance variable and the Hessian of the performance variable comprises applying one or more demodulation signals to the output signal, wherein one demodulation signal of the one or more demodulation signals is associated with a perturbation matrix that generates an estimate of a Hessian, and wherein a second demodulation signal of the one or more demodulation signals is a sinusoidal signal that generates the gradient.

19. The non-transitory computer-readable storage medium of claim 17, wherein determining the gradient of the performance variable and the Hessian of the performance variable comprises:

converting the values of the output signal to a vector to create a data sample vector;

generating a multivariable form of the data sample vector using a least squares technique; and obtaining a gradient vector and a Hessian based on the multivariable form of the data sample vector.

20. The non-transitory computer-readable storage medium of claim 17, wherein the operations comprise applying the adjustment to a setpoint input, the adjustment causing the controller to adjust an operation of the equipment to drive the performance variable to the extremum.

* * * * *